United States Patent
Lalla

(10) Patent No.: US 7,200,503 B2
(45) Date of Patent: Apr. 3, 2007

(54) FIELD DEVICE ELECTRONICS FED BY AN EXTERNAL ELECTRICAL ENERGY SUPPLY

(75) Inventor: Robert Lalla, Lörrach (DE)

(73) Assignee: Endrss + Hauser Flowtec AG, Reinach (CH)

( * ) Notice: Subject to any disclaimer, the term of this patent is extended or adjusted under 35 U.S.C. 154(b) by 0 days.

(21) Appl. No.: 11/319,619

(22) Filed: Dec. 29, 2005

(65) Prior Publication Data

US 2006/0161359 A1    Jul. 20, 2006

Related U.S. Application Data

(60) Provisional application No. 60/639,791, filed on Dec. 29, 2004.

(30) Foreign Application Priority Data

Dec. 29, 2004 (DE) .................. 10 2004 063 735
Mar. 10, 2005 (DE) .................. 10 2005 011 510

(51) Int. Cl.
    *G01R 27/00* (2006.01)

(52) U.S. Cl. ...................................... 702/65

(58) Field of Classification Search .............. 702/65; 324/600
See application file for complete search history.

(56) References Cited

U.S. PATENT DOCUMENTS 6,397,322 B1    5/2002 Voss ............................. 712/35
2003/0076075 A1*    4/2003 Ma et al. ..................... 323/209

FOREIGN PATENT DOCUMENTS

WO    WO 02/103327 A1    12/2002

\* cited by examiner

*Primary Examiner*—Michael Nghiem
*Assistant Examiner*—Tung S. Lau
(74) *Attorney, Agent, or Firm*—Bacon & Thomas, PLLC

(57) ABSTRACT

An electric current controller for field-device electronics controls and/or modulates the supply current. The supply current is driven by a supply voltage provided by an external energy supply. The field-device electronics has an internal operating and evaluating circuit for controlling the field device, as well as an internal supply circuit, the internal input voltage being derived from the supply voltage for feeding the internal operating and evaluating circuit. In the supply circuit is a voltage controller flowed-through, at least at times, by a first component of the supply current. The voltage controller provides in the field-device electronics a first internal, useful voltage controlled to be essentially constant at a predetermined, first voltage level. Moreover, the supply circuit has a second voltage controller flowed through, at least at times, by a second current component of the supply current. The second voltage controller provides in the field-device electronics a second internal. Useful voltage, which is variable over a predetermined voltage range.

24 Claims, 9 Drawing Sheets

FIELD DEVICE ELECTRONICS FED BY AN EXTERNAL ELECTRICAL ENERGY SUPPLY

FIELD OF THE INVENTION

The invention relates to a field-device electronics for a field device. The field-device electronics is fed by an external electrical energy, or power, supply. The invention relates, as well, to a field device having such a field-device electronics.

BACKGROUND OF THE INVENTION

In the technology of industrial process measurements, especially also in connection with the automation of chemical or technical-method processes and/or the control of industrial plants, measuring devices installed near to the process, so-called field devices, are used for locally producing measured-value signals as analog or digital representations of process variables. Likewise, field devices can be embodied as adjusting devices for varying one or more of such process variables and, in such respect, actively guiding the flow of the process. Such process variables to be registered, or adjusted, as the case may be, include, for example, and as can also be perceived from the cited state of the art, mass flow rate, density, viscosity, fill level, limit level, pressure, temperature, or the like, of a liquid, powdered, vaporous or gaseous medium, conveyed, or stored, as the case may be, in a corresponding containment, such as e.g. a pipeline or a tank. Additional examples for such field devices, which are known, per se, to those skilled in the art, are described extensively and in detail in WO-A 03/048874, WO-A 02/45045, WO-A 02/103327, WO-A 02/086426, WO-A 01/02816, WO-A 00/48157, WO-A 00/36379, WO-A 00/14485, WO-A 95/16897, WO-A 88/02853, WO-A 88/02476, U.S. Pat. No. 6,799,476, U.S. Pat. No. 6,776,053, U.S. Pat. No. 6,769,301, U.S. Pat. No. 6,577,989, U.S. Pat. No. 6,662,120, U.S. Pat. No. 6,574,515, U.S. Pat. No. 6,535,161, U.S. Pat. No. 6,512,358, U.S. Pat. No. 6,487,507, U.S. Pat. No. 6,480,131, U.S. Pat. No. 6,476,522, U.S. Pat. No. 6,397,683, U.S. Pat. No. 6,352,000, U.S. Pat. No. 6,311,136, U.S. Pat. No. 6,285,094, U.S. Pat. No. 6,269,701, U.S. Pat. No. 6,236,322, U.S. Pat. No. 6,140,940, U.S. Pat. No. 6,014,100, U.S. Pat. No. 6,006,609, U.S. Pat. No. 5,959,372, U.S. Pat. No. 5,796,011, U.S. Pat. No. 5,742,225, U.S. Pat. No. 5,687,100, U.S. Pat. No. 5,672,975, U.S. Pat. No. 5,604,685, U.S. Pat. No. 5,535,243, U.S. Pat. No. 5,469,748, U.S. Pat. No. 5,416,723, U.S. Pat. No. 5,363,341, U.S. Pat. No. 5,359,881, U.S. Pat. No. 5,231,884, U.S. Pat. No. 5,207,101, U.S. Pat. No. 5,131,279, U.S. Pat. No. 5,068,592, U.S. Pat. No. 5,065,152, U.S. Pat. No. 5,052,230, U.S. Pat. No. 4,926,340, U.S. Pat. No. 4,850,213, U.S. Pat. No. 4,768,384, U.S. Pat. No. 4,716,770, U.S. Pat. No. 4,656,353, U.S. Pat. No. 4,617,607, U.S. Pat. No. 4,594,584, U.S. Pat. No. 4,574,328, U.S. Pat. No. 4,524,610, U.S. Pat. No. 4,468,971, U.S. Pat. No. 4,317,116, U.S. Pat. No. 4,308,754, U.S. Pat. No. 3,878,725, EP-A 1 158 289, EP-A1 147 463, EP-A 1 058 093, EP-A 984 248, EP-A 591 926, EP-A 525 920, or EP-A 415 655, DE-A 44 12 388 or DE-A 39 34 007. The field devices disclosed therein are, in each case, fed by an external, electrical energy supply, which provides a supply voltage and a supply current driven thereby, flowing through the electronics of the field devices.

For the case in which the field device serves as a measuring device, it additionally contains an appropriate physical-to-electrical, or chemical-to-electrical, measurement transducer for electrically registering the relevant process variables. Such transducer is, most often, inserted in the wall of the containment carrying the medium or into the course of a line, for instance a pipeline, conveying the medium, and serves to produce a measurement signal, especially an electrical measurement signal, representing the primarily registered process variable as accurately as possible. For processing the measurement signal, the measurement transducer is, in turn, connected with the operating and evaluating circuit provided in the field-device electronics and serving especially for a further processing or evaluation of the at least one measurement signal. In a large number of such field devices, the measurement transducer is additionally so actuated by a driving signal generated, at least at times, by the operating and evaluating circuit, that the transducer interacts at least directly with the medium in a manner suitable for the measurement or, alternatively, essentially directly with the medium via an appropriate probe, in order to provoke reactions reflecting the parameter to be registered. The driving signal can, in such case, be controlled, for example with respect to a current strength, a voltage level and/or a frequency. Examples of such active measurement transducers, thus measurement transducers appropriately converting an electric driving signal in the medium, are, especially, flow measurement transducers serving for the measurement of media flowing at least at times. The transducers utilize at least one coil actuated by the driving signal to produce a magnetic field, or at least one ultrasound emitter actuated by the driving signal, or a fill level, and/or limit level, transducer serving for measuring and/or monitoring fill levels in a container, such as e.g. microwave antennas, Goubau lines, thus a waveguide for acoustic or electromagnetic surface waves, vibrating immersion elements, or the like.

For accommodating the field-device electronics, field devices of the described kind further include an electronics housing, which, as e.g. disclosed in U.S. Pat. No. 6,397,683 or WO-A 00/36379, can be situated remotely from the field device and connected therewith only via a flexible cable, or which, as shown e.g. also in EP-A 903 651 or EP-A 1 008 836, is arranged directly on the measurement transducer or in, or on, a measurement transducer housing separately housing the measurement transducer. Often, the electronics housing then serves, as shown, for example, in EP-A 984 248, U.S. Pat. No. 4,594,584, U.S. Pat. No. 4,716,770, or U.S. Pat. No. 6,352,000, also to accommodate some mechanical components of the measurement transducer, such as e.g. membrane, rod, shell or tubular, deforming or vibrating members deforming during operation, under the influence of mechanical forces; compare, in this connection, also the above-mentioned U.S. Pat. No. 6,352,000. Field devices of the described kind are, furthermore, usually connected together and/or with appropriate process control computers via a data transmission system connected to the field-device electronics. The field devices transmit their measured value signals to such locations e.g. via (4 mA to 20 mA)-current loops and/or via digital data bus and/or receive operating data and/or control commands in corresponding manner. Serving as data transmission systems here are especially fieldbus systems, such as e.g. PROFIBUS-PA, FOUNDATION fieldbus, as well as the corresponding transmission protocols. By means of the process control computers, the transmitted measured value signals can be processed further and visualized as corresponding measurement results e.g. on monitors and/or converted into control signals for other field devices embodied as actuators, e.g. in the form of solenoid-controlled valves, electric motors, etc.

In the case of modern field devices, these are often so-called two-wire field devices, thus field devices in the case of which the field-device electronics is electrically connected with the external, electrical energy supply solely via a single pair of electrical lines and in the case of which the field-device electronics also transmits the instantaneous measured value via the single pair of electrical lines to an evaluation unit provided in the external, electrical energy supply and/or electrically coupled therewith. The field-device electronics includes, in such case, always an electrical current controller for setting and/or modulating, especially clocking, such as strobing, triggering or firing, the supply current, an internal operating and evaluating circuit for controlling the field device, as well as an internal supply circuit lying at an internal input voltage of the field-device electronics derived from the supply voltage, feeding the internal operating and evaluating circuit and having at least one voltage controller, e.g. regulator, flowed through by a variable current component of the supply current and providing an internal useful voltage in the field-device electronics which is regulated, or controlled, to be essentially constant at a predeterminable voltage level. Examples of such two-wire field devices, especially two-wire measuring devices or two-wire actuators can be found in, among others, WO-A 03/048874, WO-A 02/45045, WO-A 02/103327, WO-A 00/48157, WO-A 00/26739, U.S. Pat. No. 6,799,476, U.S. Pat. No. 6,577,989, U.S. Pat. No. 6,662,120, U.S. Pat. No. 6,574,515, U.S. Pat. No. 6,535,161, U.S. Pat. No. 6,512,358, U.S. Pat. No. 6,480,131, U.S. Pat. No. 6,311,136, U.S. Pat. No. 6,285,094, U.S. Pat. No. 6,269,701, U.S. Pat. No. 6,140,940, U.S. Pat. No. 6,014,100, U.S. Pat. No. 5,959,372, U.S. Pat. No. 5,742,225, U.S. Pat. No. 5,672,975, U.S. Pat. No. 5,535,243, U.S. Pat. No. 5,416,723, U.S. Pat. No. 5,207,101, U.S. Pat. No. 5,068,592, U.S. Pat. No. 5,065,152, U.S. Pat. No. 4,926,340, U.S. Pat. No. 4,656,353, U.S. Pat. No. 4,317,116, EP-A 1 147 841, EP-A 1 058 093, EP-A 591 926, EP-A 525 920, EP-A 415,655, DE-A 44 12 388, or DE-A 39 34 007.

For historical reasons, such two-wire field devices are, for the most part, so designed that a supply current instantaneously flowing in the single-pair line in the form of a current loop at an instantaneous current strength set at a value lying between 4 mA and 20 mA, at the same time, also represents the measured value produced by the field device at that instant, or the actuating value instantaneously being sent to the field device, as the case may be. As a result of this, a special problem of such two-wire field devices is that the electric power at least nominally dissipatable or to be dissipated by the field-device electronics—in the following referenced in short as "available power"—can fluctuate during operation in practically unpredictable manner over a wide range. To accommodate this, modern two-wire field devices (2L, or two line, field devices), especially modern two-wire measuring devices (2L measuring devices) with (4 mA to 20 mA)-current loops, are, therefore, usually so designed that their device functionality implemented by means of a microcomputer provided in the evaluating and operating circuit is variable, and, to this extent, the operating and evaluating circuit, which, for the most part, does not dissipate much power anyway, can be adapted to the instantaneously available power.

A suitable adapting of the field-device electronics to the available power can e.g., as also proposed in U.S. Pat. No. 6,799,476, U.S. Pat. No. 6,512,358, or U.S. Pat. No. 5,416,723, be achieved by matching the power instantaneously dissipated in the field device to the instantaneously available power, and, indeed, in a manner such that individual functional units of the operating and evaluating circuit are operated with appropriately variable clock speeds, or, depending on the level of the instantaneously available power, even turned off for a period of time (ready, or sleep, mode). In the case of field devices embodied as two-wire measuring devices with active measurement transducer, the electric power instantaneously dissipated in the field device can, as disclosed in, among others, U.S. Pat. No. 6,799,476, U.S. Pat. No. 6,014,100, or WO-A 02/103327, additionally be matched to the instantaneously available power by adapting also the electric power instantaneously dissipated in the measurement transducer, for example by clocking of the, as required, buffered driving signal, along with a corresponding matchable strobe rate, with which the driving signal is clocked, and/or by reducing a maximum current strength and/or a maximum voltage level of the driving signal.

However, in the case of field devices embodied as two-wire measuring devices, a varying of the device functionality has, for the most part, the result that, during operation, an accuracy, with which the operating and evaluating circuit determines the measured value, and/or a frequency, with which the operating and evaluating circuit, for example, updates the measured value, are/is subject to changes in the instantaneously available power. Also the buffering of excess power present at times can only conditionally remedy this disadvantage of two-wire measuring devices with (4 mA to 20 mA)-current loops. On the one hand, due to the intrinsic explosion safety often required for such two-wire measuring devices, at best, existing excess electrical energy can be stored in only very limited amounts internally in the field-device electronics. On the other hand, however, the instantaneous supply current, and, to such extent, also the, at best, available excess energy, depends only on the instantaneous measured value, so that, in the case of a lastingly very low, but, timewise, strongly varying, measured value, a correspondingly provided energy buffer can, over a longer period of time, become completely discharged. Moreover, for establishing such a complex power management in the field device, a very comprehensive and, thus, also very demanding power measurement is required, both with respect to circuitry and with respect to energy; compare, in this connection, also WO-A 00/26739, U.S. Pat. No. 6,799, 476, U.S. Pat. No. 6,512,358, or EP-A 1 174 841

Apart from this, it has been found, in the case of field devices of the described kind having a measurement transducer for the conveying and measuring of media flowing at least at times, that the adaptive clocking of driving signals and/or of individual components of the operating and evaluating circuit is only conditionally suitable. This is true, especially in the application of a vibration-type measurement transducer, such as described, for example, in the above-mentioned U.S. Pat. No. 6,799,476, U.S. Pat. No. 6,691,583, U.S. Pat. No. 6,006,609, U.S. Pat. No. 5,796,011, U.S. Pat. No. 5,687,100, U.S. Pat. No. 5,359,881, U.S. Pat. No. 4,768,384, U.S. Pat. No. 4,524,610, or WO-A 02/103327. The field devices disclosed there serve to measure parameters of media flowing in pipelines, mainly mass flow rate, density or viscosity. To this end, the corresponding measurement transducer will include at least one measuring tube vibrating during operation and serving for the conveying of the medium, an exciter mechanism electrically connected with the field-device electronics and having an oscillation exciter mechanically interacting with the measuring tube for driving the measuring tube, as well as a sensor arrangement, which generates measurement signals by means of at least one oscillation sensor arranged on the measuring tube, for locally representing the measuring tube oscillations. Both the oscillation exciter and the oscillation sensor are, in such case, preferably of the electrodynamic type, thus constructed of a magnet coil and a plunging armature interacting therewith via a magnetic field.

Due to the highly accurate amplitude and frequency control of the exciter mechanism driving signal required for the operation of such a measurement transducer, unavoidable, for one thing, is a timewise high-resolution sampling of the measuring tube oscillations. Equally, in the case of measurements made on flowing media, the issued measured value must also itself be updated often. On the other hand, a, most often, very high mechanical time constant of the oscillation system formed by the measurement transducer leads to the fact that, in the case of possible accelerations of the same, especially during non-stationary, transient happenings, a high driving power must be used and/or relatively long settling times assessed. Further studies in this connection have, however, additionally shown that, because of the usually limited storage capacity for electric power, even a buffering of excess energy in the field device scarcely leads to any significant improvement of the signal-to-noise ratio dependent on the amplitude of the measuring tube oscillations. In this respect, even a temporary and partial switching-off of the operating and evaluating circuit is little suited for two-wire measuring devices with active measurement transducer of the described kind, especially for two-wire measuring devices having a vibration-type measurement transducer involving the conveyance of flowing media.

A further possibility for improving the power capability of field devices of the described kind, especially two-wire measuring devices, is, at least in the case of minimal available power, to use as much thereof as possible actually for the implementing of the device functionality, thus to optimize a corresponding efficiency of the field device, at least in the region of small available power. Supply circuits for the internal supply of the field electronics built on this principle are discussed in detail, for example, in U.S. Pat. No. 6,577,989, or U.S. Pat. No. 6,140,940. Especially, the solutions proposed therein aim to optimize the internally actually dissipatable, electrical power. For this purpose, there is provided at the input of the field-device electronics, for adjusting and maintaining the above-mentioned, internal input voltage of the field-device electronics at a predeterminable, as required also adjustable, voltage level, a voltage stabilizer, which, as a function of the instantaneously available power and an instantaneously actually needed power, has flowing through it, at least at times, a variable current component branched from the supply current. However, a disadvantage of this field-device electronics is that all internal consumers are supplied practically from one and the same internal useful voltage and a possible collapse of this single useful voltage, for instance because of too little supply current, can lead to a state in which normal operation of the field device is no longer possible, or even to an abrupt, temporary, total stoppage of the field-device electronics.

SUMMARY OF THE INVENTION

Starting from the above-discussed disadvantages of the state of the art, as viewed on the basis of the given examples of conventional 2L-measuring devices, an object of the invention is to provide, for a field device of the described kind, a suitable field-device electronics, which makes it possible, at least in normal operation of the field device, to keep the evaluating and operating circuit, especially a microprocessor provided therein, continuously in operation and, in such case, to supply at least individual, selected, function units, especially the provided microprocessor, always with electric energy in sufficient measure.

For achieving such object, the invention provides, for a field device, a field-device electronics fed from an external electrical energy supply providing an, especially unipolar, supply voltage and delivering, driven by such voltage, an, especially unipolar and/or binary, variable supply current, which field-device electronics includes:
  a current controller, flowed-through by the supply current, for adjusting and/or modulating, especially clocking, the supply current,
  an internal operating and evaluating circuit for controlling the field device, as well as
  an internal supply circuit lying at an internal input voltage of the field-device electronics derived from the supply voltage, and feeding the internal operating and evaluating circuit, the internal supply circuit including
  a first voltage controller flowed-through, at least at times, by an, especially variable, first current component of the supply current and providing in the field-device electronics an internal, first useful voltage essentially constantly controlled at a first, predeterminable, voltage level,
  a second voltage controller flowed-through, at least at times, by an, especially variable, second current component of the supply current and providing in the field-device electronics an internal, second useful voltage variable over a predeterminable voltage range, as well as
  a voltage stabilizer flowed-through, at least at times, by an, especially variable, third current component of the supply current and providing for the setting and maintaining of the internal input voltage of the field-device electronics at a predeterminable voltage level,
  wherein the operating and evaluating circuit is flowed-through, at least at times, both by an, especially variable, first useful current driven by the first useful voltage, and by an, especially variable, second useful current driven by the second useful voltage.

Additionally, the invention resides in a field device including the aforementioned field-device electronics. In a first variant of the filed device of the invention, such serves for measuring and/or monitoring at least one, predetermined, physical and/or chemical parameter, especially a flow rate, density, viscosity, fill level, pressure, temperature, pH-value or the like, of a medium, especially a medium conveyed in a pipeline and/or a container, and the field device includes therefor, additionally, a physical-electrical measurement transducer electrically coupled with the field-device electronics, for reacting to changes of the at least one parameter and for issuing, at least at times, at least one measurement signal corresponding with the parameter, especially a variable signal voltage and/or a variable signal current. In a second variant of the field device of the invention, such serves for the adjusting of at least one predetermined physical and/or chemical parameter, especially a flow rate, a density, a viscosity, fill level, pressure, temperature, pH-value or the like, of a medium, especially a medium conveyed in a pipeline and/or container, and the field device includes therefor, additionally, an electrical-to-physical actuator electrically coupled with the field-device electronics and reacting to changes of at least one applied control signal, especially a variable signal voltage and/or a variable signal current, with an adjusting movement of the actuator for influencing the parameter to be adjusted.

In a first embodiment of the field-device electronics of the invention, the second useful voltage is controlled as a function of an instantaneous voltage level of the internal input voltage of the field-device electronics and/or as a function of an instantaneous voltage level of a terminal voltage derived from the supply voltage and dropping initially across the field-device electronics.

In a second embodiment of the field-device electronics of the invention, the second useful voltage is controlled as a function of an instantaneous current strength of at least one of the three current components. In a further development of this embodiment of the invention, it is provided that the second useful voltage is controlled as a function of the instantaneous current strength of the third current component. In another further development of this embodiment of the invention, it is provided further that the second useful voltage is controlled as a function of the instantaneous current strength of the second current component and an instantaneous voltage level of the internal input voltage of the field-device electronics.

In a third embodiment of the field-device electronics of the invention, the feeding, external, energy supply provides a supply voltage having a changing, especially fluctuating, voltage level.

In a fourth embodiment of the field device of the invention, the supply voltage supplied from the external energy supply drives a supply current of changing current strength, especially essentially a current strength fluctuating in a manner undeterminable in advance.

In a fifth embodiment of the field-device electronics of the invention, a storage circuit is provided in the operating and evaluating circuit to serve for temporary storage of electrical energy.

In a sixth embodiment of the field-device electronics of the invention, the voltage stabilizer has components, especially a semiconductor element or the like, serving primarily for the dissipation of electrical energy and for the disposal of the heat energy arising therein.

In a seventh embodiment of the field-device electronics of the invention, there is provided in the operating and evaluating circuit at least one microprocessor and/or a digital signal processor, in which the first useful voltage, or a secondary voltage derived therefrom, serves, at least partially, as operating voltage.

In an eighth embodiment of the field-device electronics of the invention, there is provided in the operating and evaluating circuit at least one amplifier, in which at least one of the two useful voltages, or a secondary voltage derived therefrom, serves, at least partially, as operating voltage.

In a ninth embodiment of the field-device electronics of the invention, there is provided in the operating and evaluating circuit at least one A/D converter, in which the first useful voltage, or a secondary voltage derived therefrom, serves, at least partially, as operating voltage.

In a tenth embodiment of the field-device electronics of the invention, there is provided in the operating and evaluating circuit at least one D/A converter, in which at least one of the two useful voltages, or a secondary voltage derived therefrom, serves, at least partially, as operating voltage.

In an eleventh embodiment of the field-device electronics of the invention, means are provided in the operating and evaluating circuit for comparing electric voltages dropping in the field-device electronics and/or electric currents flowing in the field-device electronics, with reference values. In a further development of this embodiment of the invention, the operating and evaluating circuit produces an alarm signal signalling an under-supplying of the field-device electronics, at least when the operating and evaluating circuit detects a subceeding, or falling beneath, by the second useful voltage, of a minimum useful voltage limit value predetermined for the second useful voltage and a subceeding, or falling beneath, by the third current component, of a minimum current component limit value predetermined for the third component. In another further development of this embodiment of the invention, the field-device electronics further includes at least one comparator, which compares a sense voltage derived from the third current component of the supply current with an associated reference voltage and/or a comparator, which compares the second useful voltage with at least one associated reference voltage.

In a twelfth embodiment of the field-device electronics of the invention, such further includes sense resistors serving for producing sense voltages essentially proportional to current.

In a thirteenth embodiment of the field-device electronics of the invention, such further includes a measuring and control unit for registering and adjusting voltages dropping in the field-device electronics, especially the second useful voltage, and/or currents flowing in the field-device electronics, especially the second and/or third current components. In a further development of this embodiment of the invention, the measuring and control unit controls the voltage stabilizer such that the third current component flows, when the comparator comparing the second useful voltage with at least one associated reference voltage signals an exceeding by the second useful voltage of a maximum useful voltage limit value predetermined for the second useful voltage. In another further development of this embodiment of the invention, the measuring and control unit maintains a voltage difference between the input voltage and the terminal voltage at a predetermined voltage level on the basis of the input voltage and/or the terminal voltage.

In a fourteenth embodiment of the field-device electronics of the invention, the field-device electronics is electrically connected with the external electrical energy supply solely via a single pair of electric lines.

In a first embodiment of the field device of the invention, such communicates via a data transmission system, at least at times, with a control and review unit, with there being provided in the field-device electronics for such purpose additionally a communication circuit controlling the communication via the data transmission system. In a further development of this embodiment of the invention, the first useful voltage, or a secondary voltage derived therefrom, serves, at least partially, as operating voltage for the communication circuit.

In a second embodiment of the field device according to the first variant, the operating and evaluating circuit of the field-device electronics produces, at least at times, by means of the at least one measurement signal, a measured value representing instantaneously, especially digitally, the at least one parameter to be measured and/or to be monitored. In a further development of this embodiment of the invention, the current controller adjusts the supply current on the basis of the measured value instantaneously representing the at least one parameter to be measured and/or monitored. In another further development of this embodiment of the invention, the supply current is a changeable direct-current, and the current controller is adapted to modulate the measured value, at least at times, onto an amplitude of the supply current.

In a third embodiment of the field device according to the first variant, the supply current is, at least at times, a clocked current, with the current controller being correspondingly adapted for clocking the supply current.

In a fourth embodiment of the field device according to the first variant, the operating and evaluating circuit includes at least one driver circuit for the measurement transducer, with the second useful voltage, or a secondary voltage derived therefrom, serving, at least partially, as operating voltage in the driver circuit. In a further development of this embodiment of the invention, the driver circuit contains at least one operational amplifier. In another further development of this embodiment of the invention, the driver circuit has at least one D/A converter and/or at least one signal generator for producing the driver signal. According to a next further development of this embodiment of the invention, the measurement transducer has a variable, electrical impedance fed by the driver circuit, especially a magnet coil of variable inductance and/or a measuring capacitor of variable capacitance. Furthermore, it is provided that the electrical impedance of the measurement transducer changes as a function of at least one parameter to be measured and/or to be monitored. Additionally, it is provided that a signal voltage falling across the changing electrical impedance and/or a signal current flowing through the changing electrical impedance serves as measurement signal.

In a fifth embodiment of the field device according to the first variant, the operating and evaluating circuit has at least one A/D converter for the at least one measurement signal, in which the first useful voltage, or a secondary voltage derived therefrom, serves, at least partially, as operating voltage. In a further development of this embodiment of the invention, the operating and evaluating circuit has at least one microcomputer connected with the A/D converter, especially a microcomputer formed by means of a microprocessor and/or a signal processor, for generating the measured value, with the first useful voltage serving, at least partially, as an operating voltage of the microcomputer.

In a sixth embodiment of the field device according to the first variant, the measurement transducer includes at least one measuring tube inserted into the course of a pipeline for conveying the medium, especially a measuring tube vibrating, at least at times, during operation. In a further development of this embodiment of the invention, at least one magnet coil is arranged on the measurement transducer for producing a magnetic field, especially a variable magnetic field. In an embodiment of this further development of the invention, the magnet coil has, during operation of the measurement transducer, at least at times, an exciter current flowing through it, especially an exciter current which is bipolar and/or variable in a current strength, for generating the magnetic field. Such exciter current is driven by the second useful voltage, or a secondary voltage derived therefrom. In another embodiment of this further development of the invention, the magnet coil interacts via a magnetic field with a plunging armature, with magnetic field coil and armature being movable relative to one another. In another embodiment of this further development of the invention, the at least one measuring tube of the measurement transducer vibrates, at least at times, during operation, driven by an electromechanical, especially electrodynamic, exciter mechanism formed by means of the magnetic field coil and the plunging armature.

In a further development of the field device according to the first variant, the measurement transducer includes two measuring tubes inserted into the course of the pipeline for conveying the medium and vibrating, at least at times, during operation.

In a seventh embodiment of the field device according to the first variant, the measurement transducer serves for registering at least one parameter, especially a fill level, of a container containing the medium, and includes therefor at least one measuring probe, especially a microwave antenna, a Goubau line, a vibrating immersion element, or the like, protruding into a lumen of the container or at least communicating with the lumen.

In an eighth embodiment of the field device according to the first variant, the field-device electronics is electrically connected with the external electrical energy supply solely via a single pair of electric lines and transmits the measured value, produced, at least at times, for representing instantaneously, especially digitally, the at least one parameter to be measured and/or monitored, via the single pair of electric lines to an evaluating circuit provided in the external electrical energy supply and/or electrically coupled therewith. In a further development of this embodiment of the invention, an instantaneous electrical current strength of the supply current, especially an instantaneous electrical current strength adjusted to a value lying between 4 mA and 20 mA, represents the instantaneously produced, measured value.

A basic idea of the invention is to divide consumers provided in the field-device electronics—not counting the supply circuit itself—on the one hand, at least into a first group of electric circuits, or consumers, of higher priority and into a second group of electric circuits, or consumers, of lower priority, and, on the other hand, to design the supply circuit so that, in normal operation of the field device, at least the power, or energy, requirements of the first group of electric circuits is always covered. Moreover, those circuits or components, which mainly serve for storing energy internally in the field device and/or cause electric energy to dissipate out of the field device, can be assigned to a third group of electric consumers, which has current flow through it and thus is supplied with electric energy solely in the case of a sufficient supply of the first and second groups.

To the first group of electric circuits of higher priority are advantageously assigned, among others, the at least one microprocessor provided in the field-device electronics, along with the communication circuits serving for communication with possible, superordinated, control and review units. This has the advantage that the field device can, on the one hand, be kept permanently functioning and, on the other hand, can also at least be kept permanently on-line. Furthermore, for the case in which the field device is a measuring device, also the measuring channel serving for the registering and conditioning of the at least one measurement signal can primarily be assigned to the first group of electric circuits, while possibly present, exciter channels serving mainly for the operation of the electrical-to-physical measurement transducer can be implemented as electric circuits of lower priority. This has, in the case of use of the field-device electronics of the invention in a measuring device having a vibration-type measurement transducer, especially the advantage that practically the entire measuring channel extending from the oscillation sensors through to the microprocessor can be operated with the essentially constantly controlled, first useful voltage and, therefore, can be supplied permanently in normal operation with the required electric power. This has the advantage that, to such extent, the measuring tube oscillations produced during operation can always be sampled at equally high frequency and can also be processed with high resolution. Additionally, even though the exciter channel is operated partly or exclusively with the variable, second useful voltage, the measuring tube can, in normal operation, be excited essentially without any gaps, thus permanently, although, perhaps, with fluctuating oscillation amplitude. The invention is based on, among other things, the discovery that neither temporary shut-down of the microprocessor, nor intermittent operation of, for example, the exciter channel can bring-about significant improvements in the energy balance. Rather, it may important, on the one hand, to permanently supply the components with sufficient energy, which are of vital importance for the operation of the field device and, if applicable, for communication with external devices. On the other hand, it may rather acceptable to supply components with an insufficient quantity of power, which are less essential for the operation of the field device, or to shut down these components, if necessary.

Further, it has been found that it may more profitable to invest the available power prior in the at least one microprocessor and its periphery, particularly in processing and evaluating of the measurement signal than in the exciter arrangement of the transducer, if available. Consequently the exciter arrangement of the transducer may supply with residual of available power. Indeed, the optimal signal-to-noise ratio for the measurement signal may not found in this manner each time. But this deficit in the quality of the measurement signal may compensated with the evaluating process running within the at least one microprocessor, which operates highly efficient yet. Particularly it has been found that this concept may advantageous for field device, which operate continuously or at least quasi continuously, such as Coriolis mass flow meters.

A further advantage of the invention is that the field device, because of the small power required for its operation, can, without more, meet the specifications of the various explosion-protection classes. This makes the field device specially suited also for application in those explosion-endangered areas, wherein only devices of intrinsic safety are allowed. Furthermore, the field device can, in such case, be so embodied, that it can work together with the usual field busses. This can, on the one hand, occur by direct connection to the field bus, e.g. corresponding to the FIELD-BUS-protocol (FIELDBUS is a registered mark of the FIELDBUS-FOUNDATION). On the other hand, the working together can occur indirectly by means of a bus-coupler, e.g. corresponding to the so-called HART-protocol (HART is a registered mark of the HART User Group).

BRIEF DESCRIPTION OF THE DRAWINGS

The invention will now be explained in greater detail on the basis of examples of embodiments, as well as on the basis of the drawing. Functionally equal parts are provided in the separate figures with the same reference characters, which, however, are repeated in subsequent figures only when such appears helpful. The figures of the drawing show as follows.

DETAILED DESCRIPTION OF EXEMPLARY EMBODIMENTS

Figure 1:
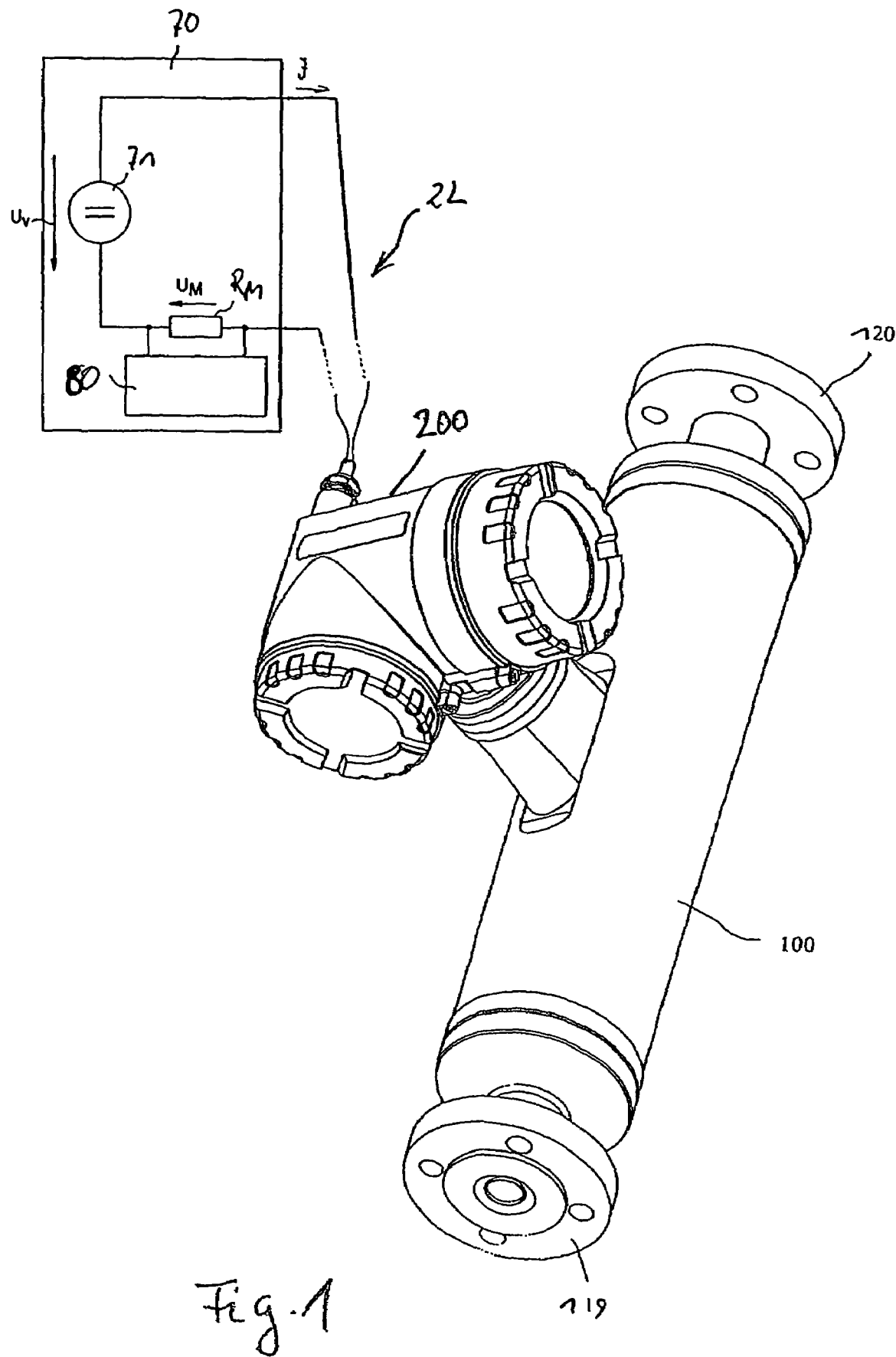
FIG. 1 perspectively in side view, a field device, as well as an external energy supply electrically connected therewith via a pair of electric lines.

While the invention is susceptible to various modifications and alternative forms, exemplary embodiments thereof have been shown by way of example in the drawings and will herein be described in detail. It should be understood, however, that there is no intent to limit the invention to the particular forms diclosed, but on the contrary, the intention is to cover all modifications, equivalents, and alternatives falling within the spirit and scope of the invention as defined by the intended claims.

FIG. 1 shows an example of a field device suited for application in industrial measuring and automation technology, along with a field-device electronics 20 fed from an external, electrical energy supply 70. In operation, the external, electrical energy supply 70 provides an, especially unipolar, supply voltage $U_V$ and delivers in accompaniment therewith a variable, especially binary, supply current I correspondingly driven by the supply voltage $U_V$. For this purpose, the field-device electronics is electrically connected, during operation, with at least a pair of electric lines 2L. As a result of the voltage drop naturally occurring between external energy supply 70 and the input of the field-device electronics 20, the supply voltage $U_V$ is, however, reduced over this distance to the terminal voltage $U_K$ actually present at the input to the field-device electronics.

The field device serves, in an embodiment of the invention, for measuring and/or monitoring, as well as for repeatedly delivering, measured values appropriately representing at least one, earlier designated, physical and/or chemical parameter, such as e.g. a flow rate, density, viscosity, fill level, pressure, temperature, pH-value, or the like, of a medium, especially a gas and/or a liquid, conveyed in a pipeline and/or a container. To this end, the field device includes, additionally, a physical-to-electrical measurement transducer electrically coupled with the field-device electronics for reacting to changes of the at least one parameter and for issuing, at least at times, a measurement signal corresponding to the parameter, especially in the form of a variable signal voltage and/or a variable signal current. Alternatively or supplementally, there can be provided in the field device an electrical-to-physical actuator electrically coupled with the field-device electronics for reacting to changes of at least one applied control signal, especially in the form of a variable signal voltage and/or a variable signal current, with the actuator providing an adjusting movement for influencing the parameter to be adjusted, or, stated differently, the field device can also, for example, be so designed that it serves for adjusting at least one of such physical and/or chemical parameters of the medium. For controlling the field device, especially also for activating the mentioned measurement transducer or for activating the mentioned actuator, there is further provided in the field-device electronics an internal operating and evaluating circuit 50. For the case in which the field device is a measuring device serving for the measuring of the at least one, earlier designated, physical and/or chemical parameter, it is further provided that the operating and evaluating circuit 50 determines the at least one measured value, or a plurality of corresponding measured values, for the parameter.

In the case of the field device illustrated in FIG. 1, such is an in-line measuring device serving especially for registering parameters, e.g. a mass flow rate, density and/or viscosity, of a medium, especially a gas and/or a liquid, flowing in a pipeline (not shown), and for reflecting such in a measured value $X_M$ instantaneously representing this parameter. Accordingly, the field device can be, for example, a Coriolis mass flow measuring device, a density measuring device, or also a viscosity measuring device. For producing the at least one measurement signal, the field device shown here includes a vibration-type measurement transducer 10 accommodated within a corresponding measurement transducer housing 100, as well as field-device electronics 20 accommodated in the illustrated electronics housing 200 and electrically connected in suitable manner with the measurement transducer 10.

Figure 2:
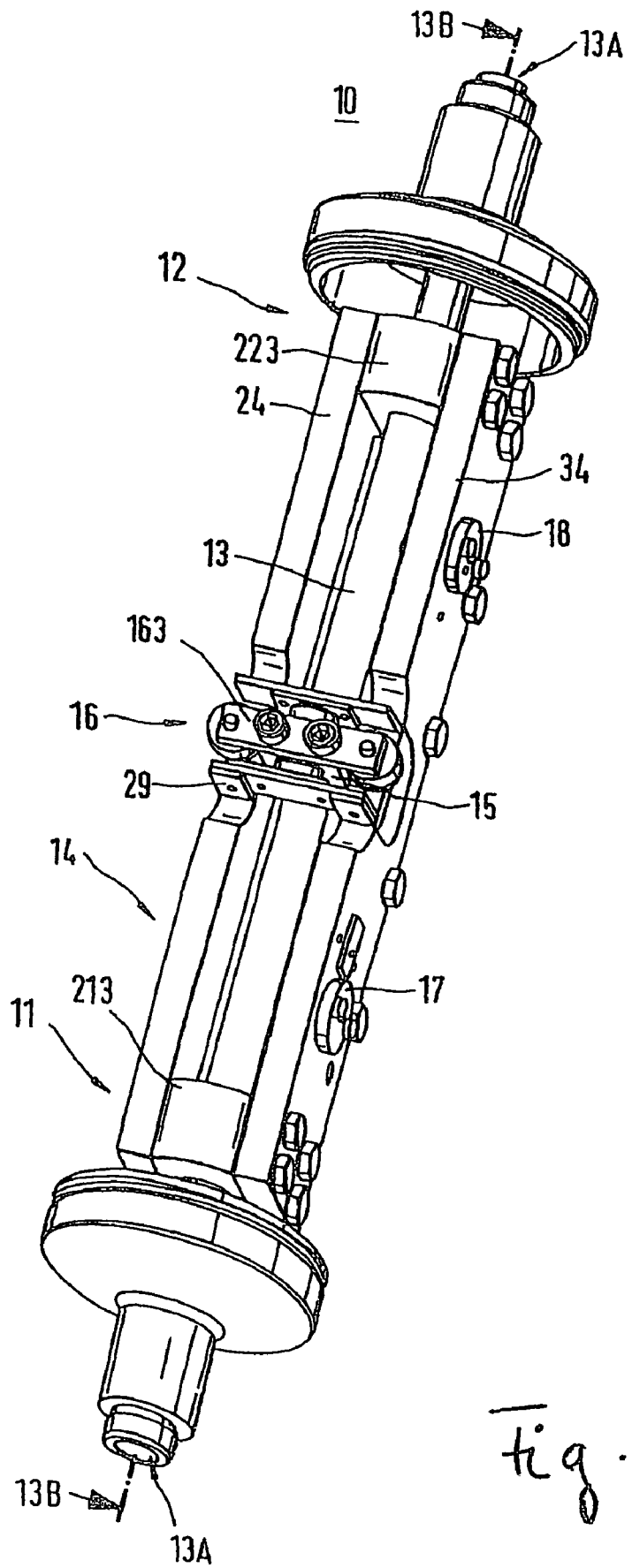
FIG. 2 perspectively in a first side view, partially in section, an example of an embodiment of a vibration-type measurement transducer suitable for the field device of FIG. 1.
Figure 3:
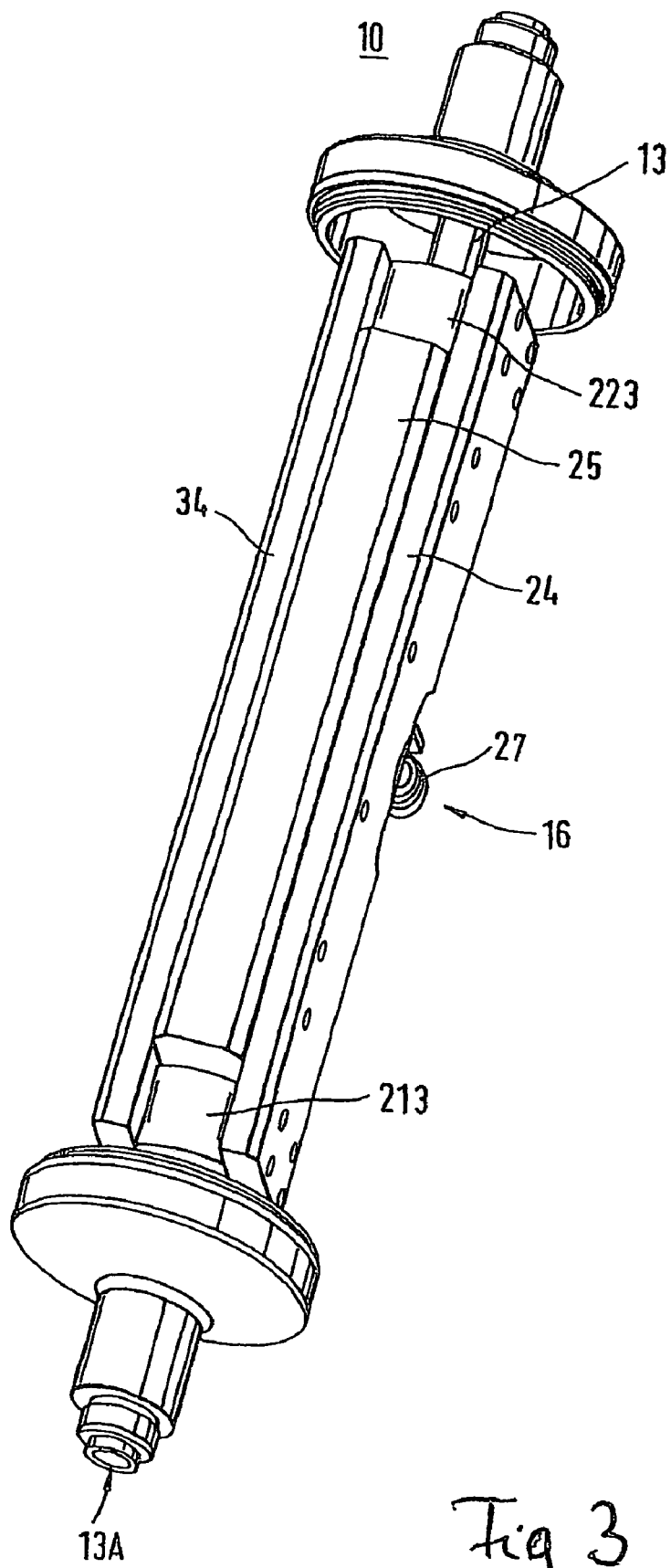
FIG. 3 perspectively in a second side view, the measurement transducer of FIG. 2.
Figure 4:
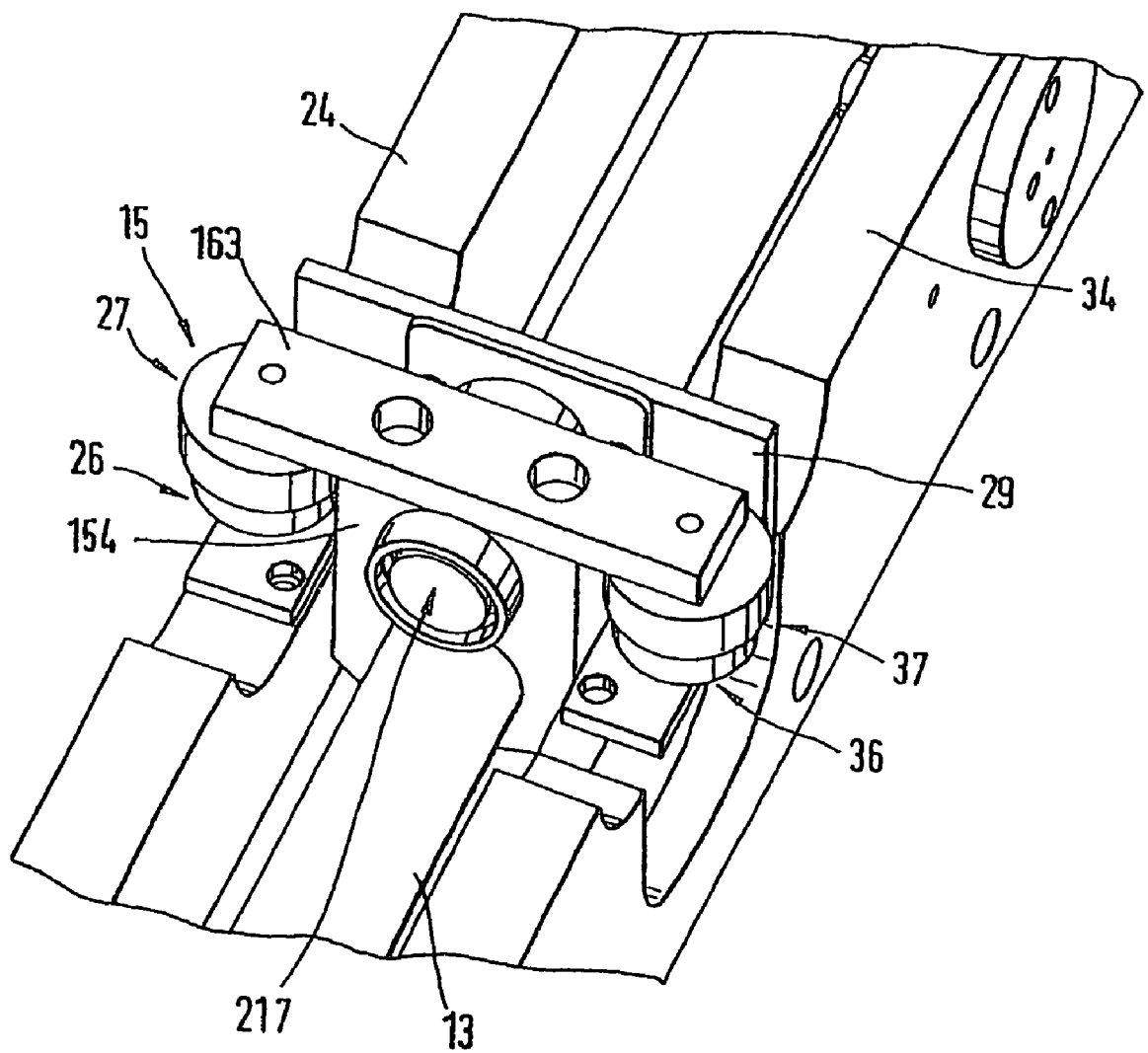
FIG. 4 an example of an embodiment of an electromechanicl exciter mechanism for the measurement transducer of FIG. 2.

FIGS. 2 to 4 show an example of an embodiment for such a measurement transducer, whose construction and manner of operation is comprehensively described e.g. also in U.S. Pat. No. 6,006,609. It is noted, however, already here, that, although the example of an embodiment of a field device in this instance concerns an in-line measuring device with a vibration-type measurement transducer, the invention, of course, can be put into practice also in other field devices, for example in in-line measuring devices using magneto-inductive measurement transducers or acoustic measurement transducers. Equally as well, the present invention can also be used in field devices which serve for measuring parameters, for example fill level and/or limit level, such as are determined in connection with containers containing media. Such field devices are usually implemented by means of measurement transducers having at least one measurement probe protruding into a lumen of the container or at least communicating with the lumen, for example a microwave antenna, a Goubau-line, a vibrating, immersion element, or the like.

For conveying the medium to be measured, the measurement transducer 10 of the example of an embodiment as shown in FIGS. 2 to 4 includes at least one measuring tube 13, having an inlet end 11 and an outlet end 12, a predeterminable measuring tube lumen 13A elastically deformable during operation, and a predeterminable nominal diameter. Elastic deformation of the measuring tube lumen 13A means, here, that, for producing the above-mentioned, medium-internal, and, consequently medium-characterizing, reaction forces, a spatial shape and/or a spatial position of the measuring tube lumen 13A is cyclically, especially periodically, changed in predetermined manner within an elastic range of the measuring tube 13; compare e.g. U.S. Pat. No. 4,801,897, U.S. Pat. No. 5,648,616, U.S. Pat. No. 5,796,011 or U.S. Pat. No. 6,006,609. In case required, the measuring tube can, as shown e.g. in EP-A 1 260 798, also be bent, for example. Moreover, it is e.g. also possible to use, instead of a single measuring tube, two bent or straight measuring tubes. Other suitable forms of embodiment for such vibration-type measurement transducers are described comprehensively e.g. in U.S. Pat. No. 6,711,958, U.S. Pat. No. 6,691,583, U.S. Pat. No. 6,666,098, U.S. Pat. No. 5,301,557, U.S. Pat. No. 5,357,811, U.S. Pat. No. 5,557,973, U.S. Pat. No. 5,602,345, U.S. Pat. No. 5,648,616 or U.S. Pat. No. 5,796,011. Especially suited as material for the straight measuring tube 13 of FIGS. 3 and 4 are e.g. titanium alloys. Instead of titanium alloys, however, also other materials usually used also for such, especially also bent, measuring tubes, can be used, such as e.g. stainless steel, tantalum or zirconium.

The measuring tube 13, which communicates in the usual manner at its inlet and outlet ends with the pipeline conveying the medium into, and out of, the measuring tube, is held oscillatably in a rigid, especially bending- and twisting-stiff, support frame 14 surrounded by the measurement transducer housing 100. The support frame 14 is affixed to the measuring tube 13 on the inlet end by means of an inlet plate 213 and on the outlet end by means of an outlet plate 223, with these two plates being, in each case, pierced by corresponding extension pieces 131, 132 of the measuring tube 13. Furthermore, the support frame 14 has a first side-plate 24 and a second side-plate 34, both of which plates 24, 34 are affixed, in each case, in such a manner to the inlet plate 213 and to the outlet plate 223, that they extend practically parallel to measuring tube 13 and are arranged spaced from this tube, as well as from each other; compare FIG. 3. Consequently, mutually facing side surfaces of the two side plates 24, 34 are likewise parallel to one another. A longitudinal strut 25 is fixed on the side plates 24, 34, spaced from the measuring tube 13, to serve as a balancing mass absorbing the oscillations of the measuring tube. The longitudinal strut 25 extends, as shown in FIG. 4, essentially parallel to the entire oscillatable length of measuring tube 13; this is, however, not obligatory, since the longitudinal strut 25 can, of course, if necessary, also be made shorter. The support frame 14, with the two side plates 24, 34, the inlet plate 213, the outlet plate 223 and the longitudinal strut 25, thus has a longitudinal line of centers of gravity extending essentially parallel to a measuring tube central axis 13B virtually connecting the inlet end 11 and the outlet end 12. The heads of the screws shown in FIGS. 3 and 4 are to indicate that the mentioned securement of the side plates 24, 34 to the inlet plate 213, to the outlet plate 223 and to the longitudinal strut 25 can occur by threaded connections; however, other suitable securement systems known to those skilled in the are can be used as well. For the case in which the measurement transducer 10 is to be assembled releasably with the pipeline, the measuring tube 13 is provided with a first flange 119 on the inlet end and a second flange 120 on the outlet end; compare FIG. 1. Instead of the flanges 19, 20, also other pipeline connecting pieces can be provided for the releasable connection with the pipeline, such as indicated e.g. in FIG. 3 in the form of so-called triclamp connectors. In case required, the measuring tube 13 can also be connected directly with the pipeline, e.g. by means of welding, hard-soldering or brazing, etc.

For producing the mentioned reaction forces in the medium, the measuring tube 13 is caused, during operation of the measurement transducer 10, to vibrate, and, thus, to elastically deform in predeterminable manner, at a predetermined oscillation frequency, especially a natural resonance frequency, in the so-called wanted mode, driven by an electromechanical exciter mechanism 16 coupled with the measuring tube. As already mentioned, this resonance frequency is also dependent on the instantaneous density of the fluid. In the illustrated example of an embodiment, the vibrating measuring tube 13, as is usual for such vibration-type measurement transducers, is spatially, especially laterally, deflected out of a static, rest position; the same is essentially true also for those measurement transducers, in which one or more bent measuring tubes execute cantilever oscillations about a corresponding, imaginary, longitudinal axis virtually connecting the in- and out-let ends, or also for those measurement transducers, in which one or more straight measuring tubes execute planar, bending oscillations about a measuring tube longitudinal axis. In another case, in which the measurement transducer 10 executes, as described e.g. in the mentioned WO-A 95/16 897, peristaltic, radial oscillations, so that the cross section of the vibrating measuring tube is, in the usual manner therefor, symmetrically deformed, the longitudinal axis of the measuring tube remains in its static, rest position.

Figure 5:
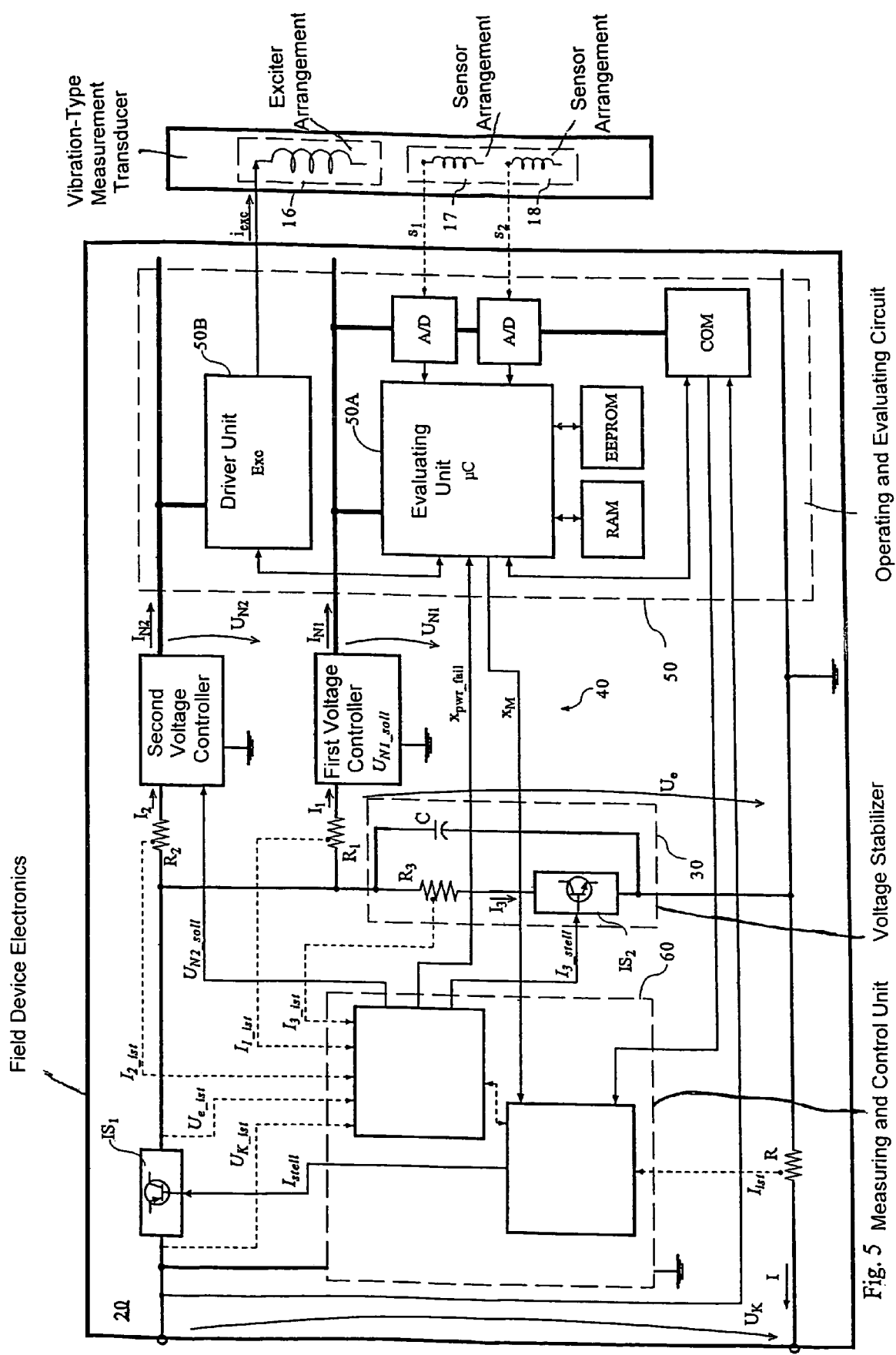
FIG. 5 in the form of a block diagram, a field-device electronics suitable for application in a field device, especially a two-wire field device.

The exciter mechanism 16 serves for producing an exciter force $F_{exc}$ acting on the measuring tube 13, the exciter force being produced by converting an electric exciter power $P_{exc}$ fed from the operating and evaluating circuit 50 in the form of an electric driver signal. The exciter power $P_{exc}$ serves in the case of exciting a natural resonance frequency essentially solely for compensation of the power fraction removed from the oscillation system by mechanical and fluid-internal friction. For achieving a highest possible efficiency, the exciter power is, therefore, adjusted as accurately as possible, such that essentially the oscillations of the measuring tube 13 in the desired, wanted mode, e.g. in a fundamental resonance frequency, are maintained. For the purpose of transferring the exciter force $F_{exc}$ onto the measuring tube, the exciter mechanism 16 includes, as shown in FIG. 5, a rigid, electromagnetically and/or electrodynamically driven, lever arrangement 15 having a cantilever 154 affixed rigidly on the measuring tube 13 and having a yoke 163. Yoke 163 is, likewise rigidly, affixed on one of the ends of cantilever 154 spaced from the measuring tube 13, and, indeed, in such a manner that it is located above the measuring tube 13 and transverse to it. Cantilever 154 can be e.g. a metal disk, or washer, which accommodates the measuring tube 13 in a bore. For other suitable embodiments of the lever arrangement 15, the already mentioned U.S. Pat. No. 6,006,609 is incorporated here by reference. Lever arrangement 15 is T-shaped and so arranged (compare FIG. 5) that it acts on the measuring tube 13 about at the half-way point, between inlet end 11 and outlet end 12, whereby the measuring tube experiences, during operation, its greatest lateral deflection at such half-way point. For driving the lever arrangement 15, the exciter mechanism 16 of FIG. 5 includes a first magnet coil 26 and an associated, first, permanently magnetic, armature 27, as well as a second magnet coil 36 and an associated, second, permanently magnetic, armature 37. The two magnet coils 26, 36, which are preferably connected in series, are affixed, especially releasably, on both sides of the measuring tube 13, to the support frame 14, beneath the yoke 163, such that they can interact with their respectively associated armatures 27, 37 during operation. The two magnet coils 26, 36 can, if required, of course also be connected in parallel with one another. As shown in FIGS. 3 and 5, the two armatures 27, 37 are affixed to yoke 163, mutually spaced from one another, in such a manner that, during operation of the measurement transducer 10, armature 27 is essentially permeated by a magnetic field of coil 26 and armature 37 essentially permeated by a magnetic field of coil 36, and on the basis of corresponding electrodynamic and/or electromagnetic forces, they are moved, especially in a manner involving plunging in their associated magnet coils. The movements of the armatures 27, 37 (especially in their functioning as plunging armatures) produced by the magnetic fields of the magnet coils 26, 36 are transferred by the yoke 163 and by the cantilever 154 to the measuring tube 13. These movements of the armatures 27, 37 are so developed relative to the respectively associated magnet coils that the yoke 163 is deflected from its rest position alternately in the direction of the side plate 24 or in the direction of the side plate 34. A corresponding axis of rotation, parallel to the already mentioned measuring tube central axis 13B can extend e.g. through the cantilever 154. The support frame 14 serving as support element for the exciter mechanism 16 includes, additionally, a holder 29 connected, especially releasably, with the side plates 24, 34, for holding the magnet coils 26, 36, and, as required, individual components of a magnet brake mechanism 217 discussed below.

In the case of the measurement transducer 10 of the example of an embodiment, the lateral deflections of the vibrating measuring tube 13 held clamped securely at the inlet end 11 and the outlet end 12 effect, simultaneously, an elastic deformation of the lumen 13A of the measuring tube. This deformation develops over practically the entire length of the measuring tube 13. Furthermore, simultaneously to the lateral deflections, twisting about the measuring tube central axis 13B is caused in the measuring tube 13, due to the torque acting on such via the lever arrangement 15, so that the measuring tube 13 oscillates essentially in a mixed bending-torsional mode of oscillation serving as wanted mode. The twisting of the measuring tube 13 can, in such case, be so developed, that a lateral deflection of an end of the cantilever 154 spaced from the measuring tube 13 is either equally, or oppositely, directed, compared to the lateral deflection of the measuring tube 13. The measuring tube 13 can, thus, execute torsional oscillations in a first bending-torsional mode corresponding to the equally-directed case or in a second bending-torsional mode corresponding to the oppositely directed case. Then, in the case of the measurement transducer 10 according to the example of an embodiment, the natural, fundamental resonance frequency of the second bending-torsional mode of oscillation is approximately, at e.g. 900 Hz, twice as high as that of the first bending-torsional mode. For the case in which the measuring tube 13 is to execute, during operation oscillations solely in the second bending-torsional mode, a magnetic brake mechanism 217, operating on the eddy current principle, is integrated into the exciter mechanism 16, for stabilizing the position of the mentioned axis of rotation. The magnetic brake mechanism 217 can thus assure that the measuring tube 13 always oscillates in the second bending-torsional mode and, consequently, possible external disturbances on the measuring tube 13 do not lead to a spontaneous switching into another bending-torsional mode, especially not into the mentioned, first mode. Details of such a magnetic braking arrangement are described comprehensively in U.S. Pat. No. 6,006,609.

For causing the measuring tube 13 to vibrate, the exciter mechanism 16 is fed during operation by means of a likewise oscillating exciter current $i_{exc}$, especially one of adjustable amplitude and adjustable exciter frequency $f_{exc}$, in such a manner that this current flows through the magnet coils 26, 36 during operation and, in corresponding manner, the magnetic fields required for moving the armatures 27, 37 are produced. The exciter current $i_{exc}$ is, as schematically shown in FIG. 5, supplied from a driver unit 50B additionally provided in the field-device electronics 20 and can be, for example, a harmonic, alternating current. The exciter frequency $f_{exc}$ of the exciter current $i_{exc}$ is, in the case of the example of an embodiment shown here, preferably so selected, or it adjusts itself, such that the laterally oscillating measuring tube 13 torsionally oscillates, to the extent possible, exclusively in the second bending-torsional oscillation mode.

It is to be noted here, in this connection, that, although in the example of an embodiment shown here, the field-device electronics 20 has only one variable inductive impedance— in this case a magnet coil of variable inductance—fed by the driver unit 50B, the driver unit 50B can also be designed to excite other electrical impedances, for example a measuring capacitor of variable capacitance, or the like. In the case of a capacitive pressure sensor as measurement transducer, its electrical impedance would then change during operation also as a function of the at least one parameter to be measured and/or monitored, with, as is known, a signal voltage falling across the changing electrical impedance and/or a signal current flowing through the changing electrical impedance serving as measurement signal.

For detecting the deformations of the measuring tube 13, the measurement transducer 10 further includes a sensor arrangement, which, as shown in FIGS. 2 and 3, produces, by means of at least a first sensor element 17 reacting to vibrations of the measuring tube 13, a first oscillation measurement signal for representing these vibrations and serving as measurement signal $s_1$. Sensor element 17 can be formed e.g. by means of a permanently magnetic armature, which is affixed to the measurement tube and which interacts with a magnet coil held by the support frame 14. Especially suited as sensor element 17 are especially those, which, based on the electrodynamic principle, register a velocity of the deflection of the measuring tube 13. However, also acceleration-measuring, electrodynamic or even distance-measuring, resistive, or optical sensors can be used. Of course, also other sensors known to those skilled in the art and suitable for the detection of such vibrations can be used, such as e.g. sensors registering strains of the measuring tube 13. The sensor arrangement further includes a second sensor element, especially one identical to the first sensor element 17, by means of which it delivers a second oscillation measurement signal likewise representing vibrations of the measurement tube 13 and, to such extent, serving as a second measurement signal $s_2$. The two sensor elements 17, 18 are, in the measurement transducer illustrated in the example of an embodiment, arranged mutually separated along the measuring tube 13, especially at equal distances from the half-way point along the length of the measuring tube 13, such that the sensor arrangement 17, 18 locally registers both inlet- and outlet-end vibrations of the measuring tube 13 and presents them in the form of corresponding oscillation measurement signals.

FIG. 5 shows, schematically in the form of a block diagram, an embodiment of a field-device electronics 20 suitable for the field device of FIGS. 1 to 4. On the right of FIG. 5, the above described vibration-type measurement transducer is schematically illustrated, with exciter mechanism 16 and sensor arrangement 17, 18, with the magnet coils required for the measurement principle of the transducer being shown symbolically.

The first measurement signal $s_1$, and the second measurement signal $s_2$, which may, or may not, be present, both usually have a signal frequency corresponding to the instantaneous oscillation frequency of the measuring tube 13. These signals are, as shown in FIG. 2, fed to a, preferably digital, evaluation unit 50A of the operating and evaluating circuit provided in the field-device electronics 20. Evaluation unit 50A serves for determining, especially numerically, a measured value, $X_M$, instantaneously representing the process variable to be registered, here e.g. the mass flow rate, density, viscosity, etc., and to convert such into a corresponding measured-value signal xM available at the output of the operating and evaluating circuit. While, in the case of the measurement transducer illustrated here, the density or also viscosity are readily determinable on the basis of just one of the measurement signals $s_1$, $s_2$, for the determining of mass flow rate, both measurement signals $s_1$, $s_2$ are used, in manner known to those skilled in the art, for ascertaining, for example in the signal time domain or in the signal frequency domain, a phase difference corresponding with the mass flow rate.

In an embodiment of the invention, the evaluation unit 50A is implemented using a microcomputer μC provided in the field-device electronics 20. The microcomputer is so programmed that it digitally determines the measured value $X_M$ on the basis of the measurement signals delivered from the sensor arrangement 17, 18. For implementing the microcomputer, e.g. suitable microprocessors and/or also modern signal processors can be used. As also shown in FIG. 5, the evaluation unit 50A further includes at least one A/D converter, via which one of the sensor signals $s_1$, $s_2$ or, as usual especially in the case of Coriolis mass flow transducers, a signal difference derived previously from the two sensor signals $s_1$, $s_2$, is supplied digitized to the microprocessor. The measurement or operational data produced and/or received by the evaluation unit 50A can, furthermore, be stored volatilely and/or persistently in corresponding digital data memories RAM, EEPROM.

Figure 6:
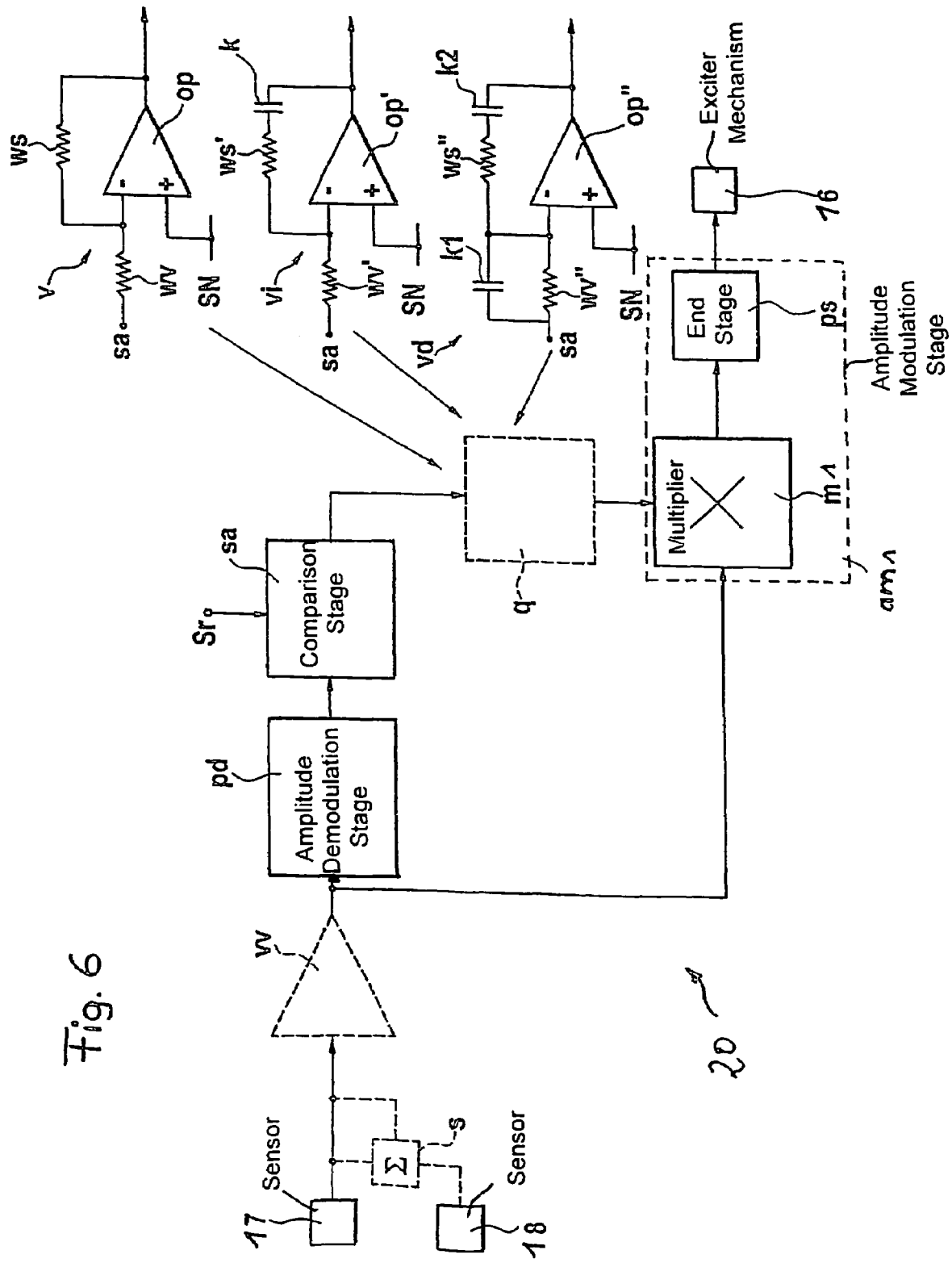
FIGS. 6 to 8 partly in the form of block diagrams, circuits of examples of embodiments of an exciter circuit suited for application in a field device of FIG. 1 having a vibration-type measurement transducer of FIGS. 2 to 4.

As already mentioned, the operating and evaluating circuit 50 additionally contains a driver unit 50B for feeding the exciter mechanism 16 with the mentioned exciter current $i_{exc}$. Separate examples of the driver unit 50B will now be explained on the basis of FIGS. 6 to 11. As shown in FIG. 5, the driver unit 50B is also in communication with the evaluation unit, especially the already mentioned microprocessor μC, from which the driver unit 50B receives e.g. the required operating data, such as e.g. the instantaneously required exciter frequency or an amplitude instantaneously required for the exciter current, or to which the driver unit 50B sends internally produced adjustment signals and/or parameters, especially also information concerning the required exciter current $i_{exc}$ and/or the exciter power $P_{exc}$ fed into the measurement transducer. In addition to the microprocessor μC or instead of the same, the driver unit can, for example, also include a digital signal processor serving to produce the driver signal. FIG. 6 shows, in the form of a block diagram, examples of embodiments for the driver unit 50B, which are suited especially for use in a 2L measuring device.

In a first variant, one of the sensor signals delivered from the sensors 17, 18 or e.g. also their sum is fed to an amplitude demodulation stage pd as input signal. Thus, the amplitude demodulation stage pd is connected at its input with one of the sensors 17, 18. In FIG. 6, that is the sensor 17. The amplitude demodulation stage pd serves for determining continuously an oscillation amplitude of the measuring tube vibrations. Additionally, the amplitude demodulation stage pd serves for delivering an output signal, e.g. a simple direct-current signal representing this registered oscillation amplitude. To this end, in a preferred embodiment of the invention, a peak value detector is provided for the input signal in the amplitude demodulation stage pd. Instead of this peak value detector, also e.g. a synchronous rectifier can be used for registering the oscillation amplitude. The rectifier is clocked by a reference signal of equal phase to the input signal. A first input of a comparison stage sa is connected with an output of the amplitude demodulation stage pd; a second input of the comparison stage sa receives an adjustable reference signal Sr, which specifies an amplitude of vibration of the measuring tube 13. The comparison stage sa determines a deviation of the output signal of the amplitude demodulation stage pd from the reference signal Sr and issues this as a corresponding output signal. This deviation can be determined and forwarded on the basis of a simple difference between the registered oscillation amplitude and that specified by the reference signal Sr in the form of an absolute amplitude error or e.g. also on the basis of a quotient of registered and specified oscillation amplitudes in the form of a relative amplitude error. To a first input of an amplitude modulation stage am1 is supplied the input signal of the amplitude demodulation stage pd and, to a second input the output signal of the comparison stage sa. The amplitude modulation stage am1 serves for modulating the input signal of the amplitude demodulation stage pd with the output signal of the comparison stage sa. In such case, e.g. one of the sensor signals $s_1$, the sum of the two sensor signals $s_1$, $s_2$ or also a signal essentially proportional thereto, produced synthetically, for example, by means of an appropriate signal generator, can serve as input signal, which, to such extent, is a carrier signal which can be quite variable as to frequency. Onto this carrier signal is modulated the error signal of variable amplitude, as produced by means of the comparison stage sa. The error signal represents, namely, the deviation of the instantaneous vibration amplitude of the measuring tube 13 from its, or their, desired oscillation amplitude represented by the reference signal Sr. Additionally, the amplitude modulation stage am1 serves to deliver the driver signal carrying the driving energy for the exciter mechanism 16. For such purpose, the amplitude modulation stage has a corresponding end stage ps for amplifying the carrier signal modulated with the modulation signal. For the purpose of the amplitude modulation of the carrier signal with the modulation signal, a multiplier m1 is additionally provided in the amplitude modulation stage am1; compare FIG. 6.

Figure 7:
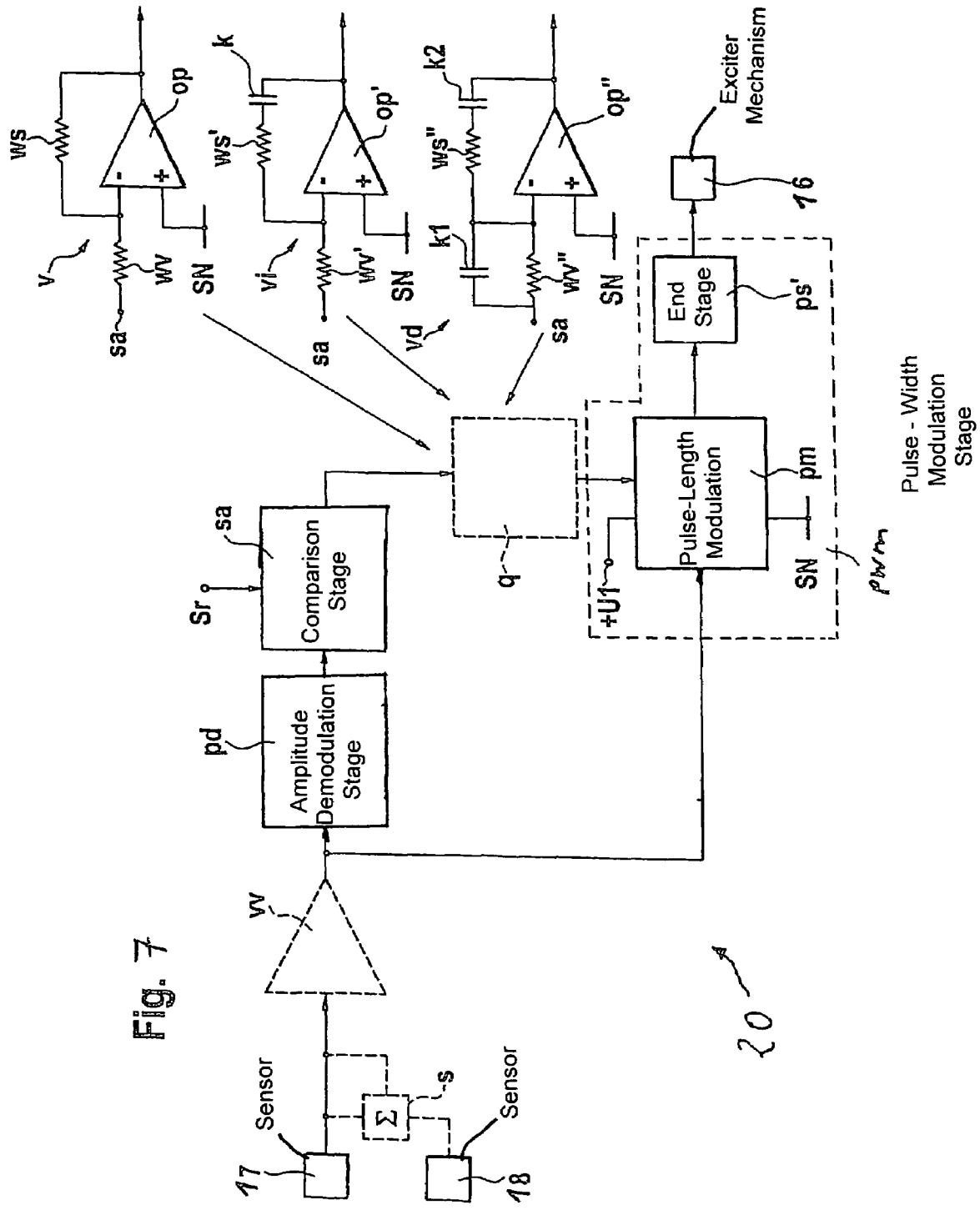

FIG. 7 shows, corresponding to the second variant of the invention, partly in the form of a block diagram, the circuit of a second variant for the driver unit 50B. The example of an embodiment in FIG. 7 differs from that in FIG. 6 essentially in that, instead of its amplitude modulation stage am1, a pulse-width modulation stage pwm is provided, having a pulse-length modulator pm clocked by an external alternating current signal. The pulse-length modulator pm is, as shown in FIG. 7, driven by a constant, positive, first, direct voltage +U1 and lies at circuit ground, or zero point, SN. Supplied to a first input of the pulse-length modulator pm—that is the carrier signal input—is the input signal of the amplitude demodulation stage pd. Thus, this first input is connected with one of the sensors—in FIG. 7 this is again the sensor 17. Supplied to a second input of the pulse-length modulator pm—this is the modulation signal input—is the error signal proportional to the determined amplitude error. The output of the pulse-length modulator pm is, in turn, connected with the input of an end stage ps', which feeds, on its output side, the exciter mechanism 16 with a corresponding driver signal. The driver signal delivered from the end stage ps' is, in this case, a rectangular signal, which is clocked with a signal frequency of the input signal of the amplitude demodulation stage pd and which has a pulse width modulated with the output signal of the comparison stage sa.

Figure 8:
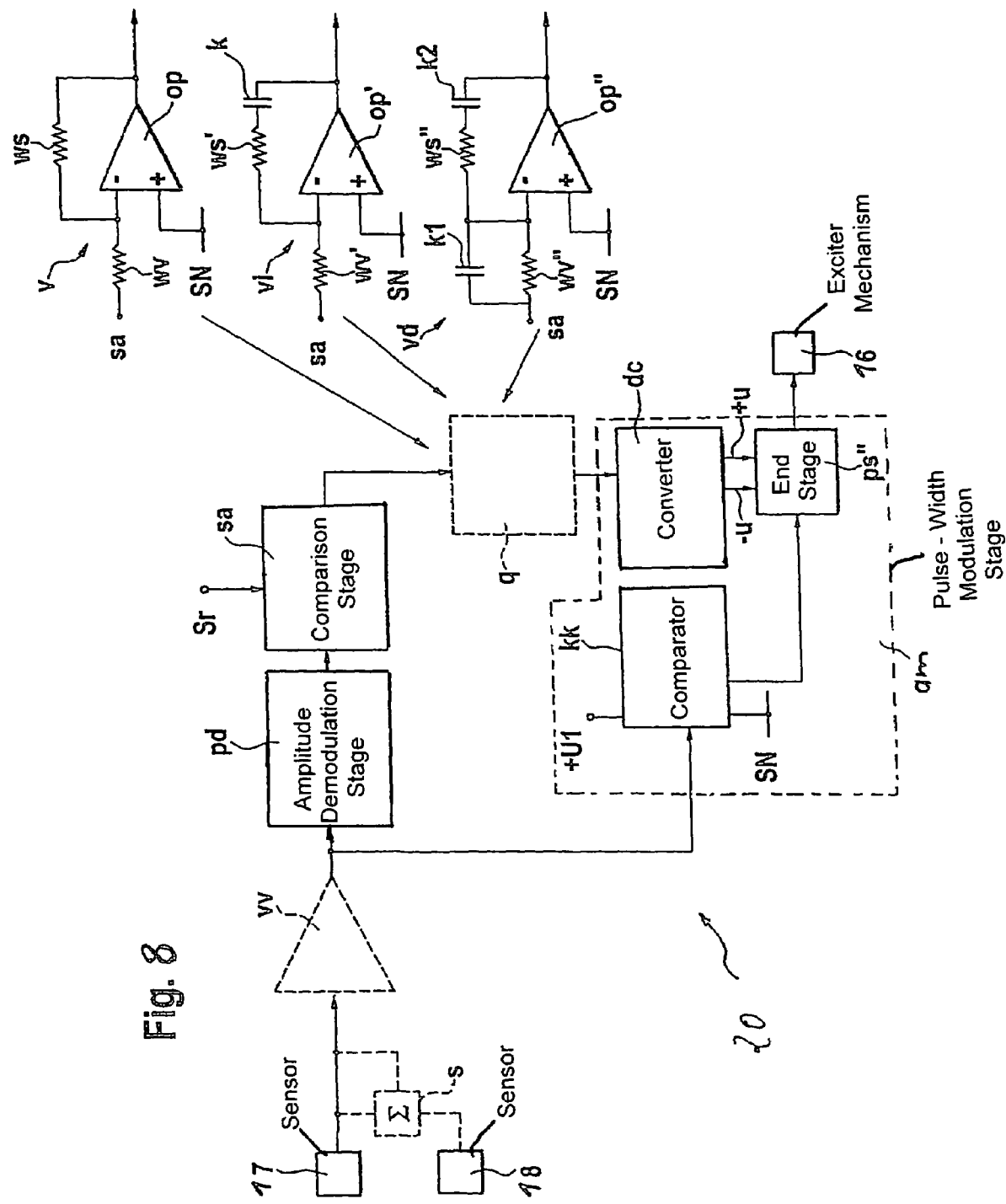

FIG. 8 shows, partly in the form of a block diagram, the circuit of a third variant of the driver unit 50B. The example of an embodiment shown in FIG. 8 differs from that of FIG. 6 in that, instead of its multiplier m1, a comparator kk and a DC-DC converter dc are provided, which delivers at least one driver voltage driving the exciter current $i_{exc}$. The amplitude of this driver voltage is, in turn, dependent on the output signal of the comparison stage sa and, therefore, is to be considered as non-constant. Depending on the driver voltage, the exciter current $i_{exc}$ can, as already mentioned, be bi-polar or, however, also unipolar. Consequently, the DC-DC converter dc delivers, in a preferred embodiment of the invention according to FIG. 8, a driver voltage having a positive first potential +u and a negative second potential −u, with a control input of the DC-DC converter dc serving for adjusting of the potentials and receiving the output signal of the comparison stage sa. The driver voltage delivered by the DC-DC converter dc, appropriately adapted in its amplitude, is applied to an end stage ps" of the pulse width modulation stage pwm as operating voltage and the end stage ps", in turn, feeds the exciter mechanism 16. Moreover, the end stage ps" is connected on its input side with an output of the comparator kk. Comparator kk is operated by the constant, positive, first direct voltage +U1 and lies at circuit ground SN. Supplied to an input of the comparator kk is the input signal of the peak value detector pd. Consequently, comparator kk is connected on its input side with one of the sensors—in FIG. 8 this is again the sensor 17.

In FIGS. 6 to 7, it is indicated in each case by dashed lines that, instead of one of the sensor signals of the sensors 17, 18, also their sum can be supplied to the peak value detector pd and to the multiplier m1, or to the pulse-length modulator pm, or to the comparator kk, as the case may be; then, these sensor signals have to be passed through a summing unit. Alternatively, however, as already mentioned, a synthetic signal can be used, produced by means of a digital signal processor and a D/A converter connected to its output, and correspondingly adapted to the sensor signal in its frequency and phase position. In FIGS. 6 to 7, still other circuit portions are shown in dashed representation, to indicate preferred further developments of the preferred exciter circuit. In one further development of the driver unit 50B, a pre-amplifier vv is provided, which is placed in front of the peak-value detector pd or, as required, the synchronous rectifier. In another further development of the driver unit 50B, an amplifier v is provided, which amplifies the output signal of the comparison stage, before it reaches the amplitude modulation stage as error signal. Such an amplifier can be an operational amplifier op, whose non-inverting input lies at circuit ground SN, whose inverting input is connected via a series resistor wv with the output of the comparison stage sa and via a shunt resistor ws with the amplifier output. The operational amplifier connected in this manner is, in each case, shown at the right top in FIGS. 6 to 7. In a next further development of the driver unit 50B, an integrating amplifier vi is provided, which amplifies and integrates the output signal of the comparison stage sa, before it reaches the multiplier m as error signal. Such an amplifier can be an operational amplifier op', whose non-inverting input lies at circuit ground SN, and whose inverting input is connected with the output of the comparison stage sa via a series resistor wv' and, via a series circuit formed of a shunt resistor ws' and a capacitor k, with the output of the amplifier. The operational amplifier op' connected in this manner is shown in each case in the right-middle of FIGS. 6 and 7.

Another further development of the driver unit 50B utilizes a differentiating and integrating amplifier vd, which amplifies, differentiates and integrates the output signal of the comparison stage sa, before it reaches multiplier m1 as error signal. Such an amplifier can be an operational amplifier op", whose non-inverting input lies at circuit ground SN, and whose inverting input is connected via a parallel circuit of a series resistor wv" and a first capacitor k1 with the output of the comparison stage sa and via a series circuit of a shunt resistor ws" and a second capacitor k2 with the amplifier output. The operational amplifier op" connected in this manner is shown in FIGS. 6 and 7 in each case at the right-bottom of the figure. The arrows in FIGS. 6 and 7 indicate that the relevant amplifier v, vi, vd is to be placed in the box q (shown in dashed representation), which lies either between the output of the comparison stage sa and the second input of the amplitude modulation stage am, or, however, between the output of the comparison stage sa and the modulation signal input of the pulse-width modulation stage pwm.

Quite within the framework of the invention is to have the functions of the individual circuit portions of FIGS. 6 and 7 implemented by corresponding analog or digital circuit portions, in the latter case, thus e.g. by means of a suitable programmed microprocessor, with the signals going to such being first passed through an analog/digital conversion and its output signals, if required, being subjected to a digital/analog conversion.

Figure 9:
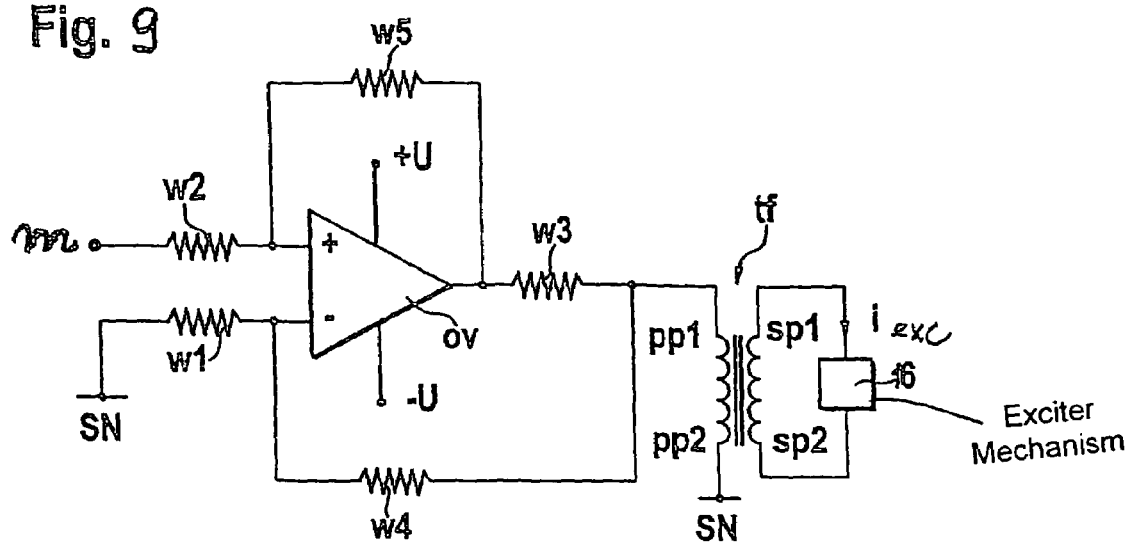
FIGS. 9 to 11 circuit diagrams of examples of embodiments of end stages suitable for the exciter circuits of FIGS. 6 to 8.

FIG. 9 shows a circuit of a first example of an embodiment of an end stage ps, which can be inserted, for example, in the amplitude modulation stage am of FIG. 6. An operational amplifier ov is powered by a positive and a negative, in each case constant, direct voltage +U, −U and is connected as follows. An inverting input lies, via a first resistor w1, at circuit ground SN and a non-inverting input is connected via a second resistor w2 to the output of the multiplier m1. An output of the operational amplifier ov is connected through a third resistor w3 with a first terminal pp1 of a primary winding of a transformer tf; a second terminal pp2 of the primary winding lies at circuit ground SN. The secondary winding of transformer tf is connected by means of its two terminals sp1, sp2 to the exciter mechanism 16.

The primary winding has a primary winding number N1 and the secondary winding a secondary winding number N2. The transformer tf is a current step-up transformer and has a transformation ratio of e.g. 20:1. The inverting input of the operational amplifier ov is connected through a fourth resistor w4 to the first terminal pp1 of the primary winding. The non-inverting input is connected with the output through a fifth resistor w5. The five resistors w1, w2, w3, w4, w5 have corresponding resistance values R1, R2, R3, R4, R5. The resistance value R1 is selected equal to the resistance value R2, and the resistance value R4 is selected equal to the resistance value R5. The alternating current i flowing into the exciter mechanism 16 is as follows, where um is the output voltage of the multiplier m: R5N1 1=um m R1 R3 N2.

Figure 10:
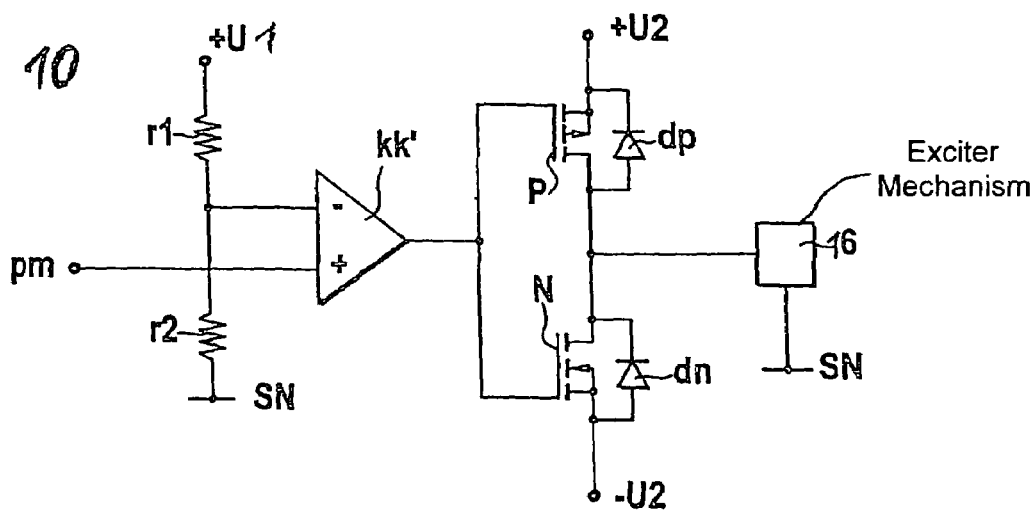

FIG. 10 shows a circuit of a preferred, second example of an embodiment of an end stage ps', which can be inserted, for example, in the pulse-width modulation stage pwm of FIG. 7. The "core" of this embodiment of the end stage, which is a complementary push-pull end stage, is a series connection of the controlled current path of a p-channel-enhancement, insulating layer, field-effect transistor P with an n-channel-enhancement, insulating layer, field effect transistor N, which will be referenced in the following as "transistors" for short. The exciter mechanism 16 is connected to the junction point of the controlled current paths. On each controlled current path, a protective diode dn, dp is connected in parallel, with each cathode lying on the positive point of the associated transistor. The end of the series connection on the p-transistor-side lies at a constant, positive, second direct voltage +U2 and its end on the n-transistor-side lies at a corresponding, negative direct voltage −U2. The gates of the transistors N, P are connected together and with an output of the comparator kk'. The non-inverting input of the comparator kk' lies on the output of the pulse-length modulator pm; compare FIG. 7. The inverting input of the comparator kk' is connected with a tap of a voltage divider composed of a resistor r1 and a resistor r2. The resistors r1, r2 have the same resistance values and lie between the positive, direct voltage +U1 and circuit ground SN. The resistors r1, r2 and the comparator kk'serve for making the output signal of the pulse-length modulator pm symmetrical with reference to the half-value of the direct voltage +U1. The exciter mechanism 16 receives, consequently, at every positively directed edge through zero for the output signal of the sensor 17, or the sum of the output signals of the sensors 17, 18, as the case may be, a positive current pulse and, at every negatively directed edge through zero for the output signal of the sensor 17, or the sum of the output signals of the sensors 17, 18, as the case may be, a negative current pulse. The respective durations of these current pulses are adjusted automatically, such that the oscillation amplitude of the measuring tube 13, as specified by the reference signal Sr, is achieved.

Figure 11:
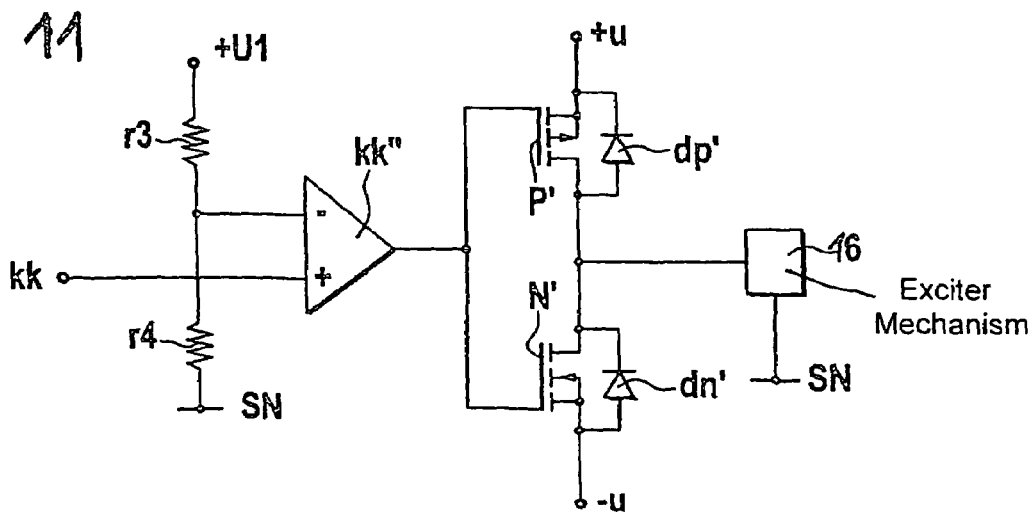

FIG. 11 shows a circuit diagram of another example of an embodiment of an end stage ps", which can be inserted, for example, in the amplitude modulation stage am1 of FIG. 8. The "core" of this embodiment of the end stage, which again is a complementary push-pull end stage, is, also here, as in the case of FIG. 10, a series connection of the controlled current path of a p-channel-enhancement, insulating layer, field-effect transistor P' with an n-channel-enhancement, insulating layer, field effect transistor N', which will again be referenced in the following as "transistors" for short. The exciter mechanism 16 is connected to the junction point of the controlled current paths. On each controlled current path, a protective diode dn', dp' is connected in parallel, with each cathode lying on the positive point of the associated transistor. The end of the series connection on the p-transistor-side lies at a positive, second direct voltage +u dependent on the output signal of the comparison stage sa and its end on the n-transistor-side lies at a negative direct voltage −u dependent on the output signal of the comparison stage sa. The gates of the transistors N', P' are connected together and with an output of the comparator kk". The non-inverting input of the comparator kk" lies on the output of the comparator kk; compare FIG. 8. The inverting input of the comparator kk" is connected with a tap of a voltage divider composed of a resistor r3 and a resistor r4. The resistors r3, r4 have the same resistance values and lie between the positive, direct voltage +U1 and circuit ground SN. The resistors r3, r4 and the comparator kk" serve for making the output signal of the comparator kk symmetrical with reference to the half-value of the direct voltage +U1. The exciter mechanism 16 receives, consequently, at every positive half-wave of the output signal of the sensor 17, or of the sum of the output signals of the sensors 17, 18, as the case may be, a positive current pulse and, at every negative half wave of the output signal of the sensor 17, or of the sum of the output signals of the sensors 17, 18, as the case may be, a negative current pulse. The respective amplitudes of these current pulses are dependent on the direct voltages +u, −u, which are themselves dependent on the output signal of the comparison stage sa, so that the oscillation amplitude of the measuring tube 13, as specified by the reference signal Sr, is achieved automatically.

The driver unit 50B, together with the measuring tube 13, represents a control loop, which electrically adjusts both to the mechanical resonance frequency of the excited vibrations of the measuring tube 13 and to the amplitude of these vibrations specified by means of the reference signal Sr.

Therefore, the previously usual driver units, utilizing an amplitude control stage and a phase-locked loop, i.e. a so-called PLL, for electrical control of the resonance frequency and the vibration amplitude, are no longer required.

As already mentioned, the field-device electronics, and, to such extent, also the field device, are fed from an external, electrical energy supply 70, for example a remotely located measurement transmitter supply device or the like, which is connected with the field device, or, more accurately, with the field-device electronics 20, via the at least one pair of electric lines 2L. The measurement transmitter supply device, in turn, can, for example, be connected via a field bus system with a superordinated process control system stationed in a process control room. In the example of an embodiment shown here, the field-device electronics, as usual in a multitude of measurement and automation technology applications, is electrically connected with the external electrical energy supply solely via a single pair of electric lines 2L. Accordingly, the field-device electronics is thus, on the one hand, supplied with electric energy via this one pair of lines. On the other hand, it is provided that the field-device electronics transmits the measured value $X_M$, produced at least at times, to an external evaluating circuit 80 located in the external electric energy supply 70 and/or electrically coupled with the energy supply, likewise via the single pair of electric lines 2L. The pair of electric lines 2L, in this case, the single pair, connecting the measurement transmitter supply device and the field device can, for example, for such purpose, be connected in series with an energy source 71 feeding the supply current I, e.g. a battery or a direct voltage source fed via an installation-internal supply network, and with measuring resistor $R_M$. Energy source 70 drives the supply current I and supplies, therefore, the field-device electronics 20 with the electric energy required for its operation. The measuring resistor $R_M$ is additionally provided with two measuring terminals 72, 73, on which the supply current instantaneously representing the measured value $X_M$ can be sensed in the form of a current-proportional, measured voltage $U_M$. The measured voltage $U_M$ can be visualized on-site or fed to a superordinated, measured value processing unit. The—here, single—pair of electric lines 2L can be embodied, for example, as a so-called two-wire, current loop, especially a 4 mA–20 mA current loop, or as a connecting line to an external, digital field bus, for example, a PROFIBUS-PA or a FOUNDATION-FIELDBUS.

In a further embodiment of the invention, it is, therefore, further provided that the instantaneous measured value $X_M$ is modulated onto the supply current I. For example, the measured value instantaneously determined by means of the field device can be represented by an instantaneous current strength (especially a current strength adjusted to a value lying between 4 mA and 20 mA) of the supply current I flowing in the pair of electric lines 2L embodied as a two-wire current loop.

In another embodiment of the invention, it is provided that the field device communicates, for example exchanges field-device-specific data, via a data transmission system, at least at times, with an external control and review unit, for example, a handheld operating device or a programmable logic controller. For this purpose, there is additionally provided in the field-device electronics 20 a communication circuit COM, which reviews and controls the communication via the data transmission system. Especially, the communication circuit serves for converting, besides the measured value $X_M$, e.g. also internal field-device parameters, into signals, which are transmittable over the pair of electric lines 2L, and for then coupling these signals into such lines. Alternatively or in supplementation thereof, the communication circuit COM can, however, also be designed for correspondingly receiving field-device parameters sent from the outside over the pair of electric lines 2L. The communication circuit COM can be, especially for the above-described case in which the field device is connected during operation solely via a two-wire current loop to the external supply circuit, e.g. an interfacing circuit working according to the HART@-Field-Communication-Protocol of the HART Communication Foundation, Austin, Tex., which uses FSK-coded, high-frequency, alternating voltages as signal carrier.

As is evident from the combination of FIGS. 1 and 5, the field-device electronics has, for the adjusting and control of voltages and/or currents internally in the field device, further, at least one current controller $IS_1$, through which the supply current I flows, for adjusting and/or modulating, especially clocking, of the supply current I. Additionally provided in the field-device electronics 20 is an internal supply circuit 40, which lies at an internal input voltage $U_e$ of the field-device electronics 20 derived from the terminal voltage $U_K$ and which serves for the electrical feeding of the internal operating and evaluating circuit 50.

For registering and regulating voltages instantaneously dropping in the field-device electronics 20 and/or instantaneously flowing currents, the supply circuit further includes a corresponding measuring and control unit 60. Moreover, the measuring and control unit 60 serves, especially for the above-mentioned case in which the measured value $X_M$ is modulated onto the supply current I, also for converting a measured-value signal $x_M$, as supplied from the operating and evaluating circuit 50 and representing the instantaneously produced, measured value $X_M$, into a correspondingly controlling, first current control signal $I_{control}$ controlling the current controller and, to such extent, also the supply current. The current control signal $I_{control}$ is, in an embodiment of the invention, so adapted that the current controller $IS_1$ becomes able to control the supply current I on the basis of the instantaneously determined measured value $X_M$ proportionally thereto. Alternatively, or in supplementation thereof, the current control signal $I_{control}$ is so developed that the current controller $IS_1$ strobes the supply current, for example binary coded for the purpose of communication according to the standard PROFIBUS-PA. For producing correspondingly current-representing, especially essentially current-proportional, sense voltages $I_{1\_actual}$, $I_{2\_actual}$, $I_{3\_actual}$, corresponding sense resistors $R_1$, $R_2$, $R_3$ are additionally provided in the supply circuit 40. At least at times, the supply current, or current components $I_1$, $I_2$, $I_3$ derived therefrom, flow through the respective resistors $R_1$, $R_2$, $R_3$.

At least for the above-described case, in which the supply current is modulated in its amplitude for the purpose of representing the measured value $X_M$, and, due to the limited electric power of the external energy supply, the supply voltage $U_V$ delivered therefrom and, consequently, associated therewith, also the terminal voltage $U_K$ correspondingly sink with increasing supply current I, or, the reverse, with sinking supply current I they again increase, the supply voltage $U_V$ and, to such extent, also the terminal voltage $U_K$ are to be considered fluctuating in voltage level in, at first, non-determinable manner and, to such extent, variable during operation in significant measure. When the field device works according to the above-mentioned, in industrial measurement technology long-established standard of 4 mA to 20 mA, the only available current range for energy supply in normal operation is that beneath 4 mA, and, depending on the level of the supply voltage, the permanently available electric power is then only around 40 to 90 mW.

The supply circuit 40 therefore has, as also schematically shown in FIG. 5, additionally, at the input, a voltage stabilizer 30, which is provided for the purpose of adjusting an internal input voltage $U_e$ (serving as primary, or base, voltage for the internal energy supply) of the field-device electronics as accurately as possible at a predetermined voltage level and for maintaining such at this voltage level also as constantly at the same level as possible, at least for the undisturbed, normal operation. For the further, internal, distribution of the electric energy to individual components or groups of the field-device electronics, such further includes, for converting the stabilized, internal, input voltage $U_e$, a first voltage controller $UR_1$, which, at least at times, is flowed-through by an, especially variable, first current component $I_1$ of the supply current and which serves for providing a first internal, useful voltage $U_{N1}$ in the field-device electronics. This voltage $U_{N1}$ is essentially constantly controlled to a predetermined, as required also parameterable, desired first voltage level $U_{N1\_desired}$. Additionally provided in the supply circuit 40 is a second voltage controller $UR_2$ likewise converting the stabilized, internal input voltage $U_e$. This second voltage controller $UR_2$ is flowed-through, at least at times, by an especially variable, second current component $I_2$ of the supply current I. The second voltage controller $UR_2$, in turn, serves for making available in the field-device electronics 20 a second internal useful voltage $U_{N2}$, which is variable over a predetermined voltage range. The voltage level for the useful voltage $U_{N2}$ best-suited for the instantaneous situation as regards consumption in the field-device electronics can be determined, for example, by the measuring and control unit 60 with regard to an instantaneous consumption situation in the field-device electronics and then forwarded correspondingly to the voltage controller $UR_2$ in the form of a voltage control signal $U_{N2\_desired}$. Voltage controllers $UR_1$, $UR_2$ can be, for example, so-called switching controllers, or regulators, and/or unclocked linear controllers, or regulators, while the voltage stabilizer can be formed, for example, by means of a shunt-regulator $IS_2$ lying in a bypass to the internal input voltage $U_e$, for example one implemented by means of a transistor and/or an adjustable Zener diode.

Beyond this, the voltage stabilizer 30 is, as also shown in FIG. 5, so designed that a third, especially variable, current component $I_3$ of the supply current I flows through it, at least at times, during normal operation, with the measuring and control unit 60 delivering a second current control signal $I_{3\_control}$ appropriately controlling the voltage stabilizer 30—here the shunt regulator $IS_2$—and, to such extent, also determining the third current component. The current control signal $I_{3\_control}$ is, in such instance, so designed, at least for the case in which the electrical power instantaneously available in the field-device electronics 20, resulting from internal input voltage $U_e$, which is maintained essentially constant, and from the instantaneously set supply current I, exceeds the electrical power actually instantaneously needed on the part of the operating and evaluating circuit 50, that it causes a transistor provided in the voltage stabilizer 30 to become conductive to a sufficient degree that a sufficiently high current component $I_3$ is caused to flow for the stabilization of the input voltage $U_e$. For this purpose, the voltage stabilizer 30 has, in a further embodiment of the invention, also components, especially a semiconductor element with cooling fin, or the like, serving for the dissipation of electric energy and for getting rid of heat energy associated therewith. On the other hand, however, the current control signal $I_{3\_control}$ is also so designed that, in the case in which the need for power in the operating and evaluating circuit 50 becomes greater, it again lessens the current component $I_3$ instantaneously flowing in the voltage stabilizer 30.

As also shown in FIG. 5, it is further provided in the field-device electronics 20 of the invention, and, to such extent, also in the field device of the invention, that the operating and evaluating circuit 50 is flowed-through, at least at times, both by a first useful current $I_{N1}$, especially such a current which is variable, driven by the first useful voltage $U_{N1}$, which is kept essentially constant, at least in normal operation, and by a second useful current $I_{N2}$, especially such a current which is variable, driven by the second useful voltage $U_{N2}$, which is allowed to vary during operation. This has the advantage that at least the assemblies and circuits of the field-device electronics 20, especially the mentioned at least one microprocessor μC, controlling the field device during normal operation and, to such extend, keeping the field device operational, can always be supplied with the electrical energy that they actually instantaneously need. Accordingly, it is provided in an embodiment of the invention, that the above-mentioned microprocessor μC and/or the mentioned signal processor are/is operated, at least partially, with first useful voltage $U_{N1}$ largely held constant during normal operation, or with a secondary voltage derived therefrom. In a further development of this embodiment of the invention, the first useful voltage $U_{N1}$, or a secondary voltage derived therefrom, serves further, at least partially, also as operating voltage for the at least one A/D-converter provided in the operating and evaluating circuit. In a further embodiment of the invention, it is provided that at least also the components of the field-device electronics controlling and maintaining the communication with the mentioned, superordinated control and review unit, thus, here, besides the microprocessor μC, also the communication circuit COM, are, at least partially, supplied by means of the first useful voltage $U_{N1}$ or by a secondary voltage derived therefrom.

Depending on which power can actually be made available during operation on the part of the external supply circuit 70 and as a function also of the actual power requirement of the consumers fed already, in the above-described manner, by the first useful voltage $U_{N1}$, also individual components of the driver unit 50B, especially such which serve for producing the driver signal $i_{exc}$, for example amplifiers, D/A-converters and/or signal generators, etc., provided therein, can, additionally, be fed, at least partially, by means of the first useful voltage $U_{N1}$ or a secondary voltage derived therefrom. However, it has been found that, alone already with currently obtainable microprocessors μC and/or A/D-converters and the peripheral circuits required therefor, one must already reckon with a permanent power requirement of about 30 mW in normal operation, so that, at least in the case of applications having a permanently available power of only about 40 mW, thus with terminal voltages of 12 V or less, the aforementioned components of the driver unit 50B can only still be connected to the first useful voltage $U_{N1}$ to a very limited extent, without endangering the desired, high stability. To such extent, an embodiment of the invention further provides that individual components of the driver unit 50B are operated, especially for longer periods of time, only using the second useful voltage $U_{N2}$. Especially, the second useful voltage $U_{N2}$ is suitable as operating voltage for the operational amplifier provided in the driver unit 50B. Accordingly then, the exciter current $i_{exc}$ for the magnetic field coils are driven essentially by the second useful voltage $U_{N2}$ or a secondary voltage derived therefrom.

For bridging-over transient voltage fluctuations on the part of the supply voltage and/or for buffering possible short-time "overloadings" of the internal field-device voltage supply due to a momentarily higher internal power requirement, for example in the case of start-up of the measurement transducer or during writing of the mentioned, persistent memory EEPROM, a further development of the invention provides in the operating and evaluating circuit a storage circuit, especially a capacitive storage circuit, serving for the temporary storage of electric energy. The energy buffer C is shown as part of the voltage stabilizer in the example of an embodiment illustrated here, so that it lies essentially permanently at the internal input voltage $U_e$. However, in order to be able to prevent, safely, a collapse of the useful voltage $U_{N1}$, at least in normal operation, it is, of course, important to make certain, at the beginning, in the design of the assemblies and circuits supplied by means of the first useful voltage $U_{N1}$, that their maximum consumed electrical power is, at most, equal to a minimum available electric power in normal operation and/or its instantaneously consumed electric power is at most equal to an instantaneously available power.

In a further embodiment of the invention, it is provided, additionally, that the second useful voltage $U_{N2}$ is controlled during operation as a function of an instantaneous voltage level of the internal input voltage $U_e$ of the field-device electronics. Alternatively or in supplementation thereto, it is provided that the second useful voltage $U_{N2}$ is controlled as a function of an instantaneous voltage level of a terminal voltage $U_K$ derived from the supply voltage and falling from the input, across the field-device electronics. It has, furthermore, been found to be advantageous, in this connection, to control the internal input voltage $U_e$ such that a voltage difference existing between this and the terminal voltage $U_K$ is held as constant as possible, for example at about 1 V, at least during normal operation. This makes it possible, among other things, to adjust the input voltage $U_e$ relatively accurately, even in the case of changing operating temperature of the current controller $IS_1$ and a change of its transfer characteristic associated therewith and so, in simple manner, to achieve a very robust control of the internal input voltage $U_e$. The control can, in such case, be implemented, for example, by means of a difference amplifier provided in the mentioned measuring and control unit 60. The difference amplifier subtracts a sense voltage correspondingly derived from the internal input voltage $U_e$ from a sense voltage correspondingly derived from the terminal voltage $U_K$. Alternatively or in supplementation thereto, the second useful voltage $U_{N2}$ can also be controlled as a function of an instantaneous current strength of at least one of the three current components $I_1, I_2, I_3$. For example, the second useful $U_{N2}$ can be controlled as a function of the instantaneous electrical current strength of the third current component $I_3$, which, taking into consideration the instantaneous input voltage $U_e$, essentially represents an excess power instantaneously present in the field-device electronics. Suitable as measured quantity, in this case, is especially also the second current control signal $I_{3\_control}$ controlling the voltage stabilizer and, to such extent, also determining the third current component $I_3$.

For determining and/or monitoring an instantaneous operating state of the field-device electronics, a further development of the invention additionally provides means for comparing electric voltages falling in the field-device electronics and/or electric currents flowing in the field-device electronics with predetermined, especially adjustable, threshold values. Such means for comparing voltages and/or currents can, for example, be embodied as integral component(s) of the already mentioned, measuring and control unit of the supply circuit. In an embodiment of this further development of the invention, the means for comparing are so designed that, on the part of the field-device electronics, an alarm signal $x_{pwr\_fail}$ signaling an under-supplying of the field-device electronics is produced, at least when a subceeding, or falling beneath, of a minimum useful voltage limit value, predetermined for the second useful voltage $U_{N2}$, by the second useful voltage $U_{N2}$ and a subceeding of a minimum current component limit value, predetermined for the third current component $I_3$, by the third current component $I_3$ are detected. Serving for registering the third current component $I_3$ can be e.g. a sense-resistor R3 provided in the voltage stabilizer and correspondingly flowed-through by the current component $I_3$, to yield an essentially current-proportional sense-voltage. In a further embodiment of the invention, the measuring and control unit controls the voltage stabilizer by means of the current control signal $I_{3\_control}$, such that the third current component $I_3$ flows, especially only when the comparator comparing the second useful voltage with at least one associated reference voltage signals an exceeding by the second useful voltage of a maximum useful voltage limit value predetermined for the second useful voltage. The means for comparing voltages and/or currents can be, for example, simple comparators, which compare, in each case, the sense voltage with an associated reference voltage, internally produced, for example, by means of the input voltage $U_e$ and being, in each case, proportional to the threshold value.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. Field device electronics for a field device, fed by an external, electric energy supply, wherein the external electric energy supply provides a supply voltage ($U_V$), especially a unipolar one, and delivers a variable supply current (I) driven thereby, especially a unipolar and/or binary supply current, which field-device electronics comprises:
   an electric current controller which a supply current (I) flows for adjusting and/or modulating, especially clocking, the supply current (I);
   an internal operating and evaluating circuit for controlling the field device; and
   an internal supply circuit feeding said internal operating and evaluating circuit and lying at an internal input voltage ($U_e$) of the field-device electronics derived from the supply voltage ($U_V$), said internal supply circuit including:
   a first voltage controller ($UR_1$) through which, at least at times, an especially variable, first current component ($I_1$) of the supply current (I) flows for providing in the field-device electronics a first internal, useful voltage ($U_{N1}$) essentially controlled to be constant at a predeterminable, first voltage level ($U_{N1\_desired}$), a second voltage controller through which, at least at times, an especially variable, second current component ($I_2$) of the supply current (I) flows for providing in the field-device electronics a second internal, useful voltage ($U_{N2}$) variable over a predeterminable voltage range, and a voltage stabilizer through which, at least at times, an especially variable, third current component ($I_3$) of the supply current flows for adjusting and maintaining the internal input voltage ($U_e$) of the field-device electronics at a predeterminable voltage level, wherein:

said operating and evaluating circuit has flowing there through, at least at times, both by an especially variable, first useful current ($I_{N1}$) driven by the first useful voltage ($U_{N1}$) and by an especially variable, second useful current ($I_{N2}$) driven by the second useful voltage ($U_{N2}$).

2. The field-device electronics as claimed in claim 1, wherein:
the second useful voltage ($U_{N2}$) is controlled as a function of an instantaneous voltage level of the internal input voltage ($U_e$) of the field-device electronics and/or as a function of an instantaneous voltage level of a terminal voltage ($U_K$) falling from the input across the field-device electronics and derived from the supply voltage ($U_V$).

3. The field-device electronics as claimed in claim 1, wherein:
the second useful voltage ($U_{N2}$) is controlled as a function of an instantaneous current strength of at least one of the three current components ($I_1$, $I_2$, $I_3$).

4. The field-device electronics as claimed in claim 1, wherein:
the second useful voltage ($U_{N2}$) is controlled as a function of an instantaneous current strength of the third current component ($I_3$).

5. The field-device electronics as claimed in claim 1, wherein:
the second useful voltage ($U_{N2}$) is controlled as a function of the instantaneous current strength of the second current component ($I_2$) and an instantaneous voltage level of the internal input voltage ($U_e$) of the field-device electronics.

6. The field-device electronics as claimed in claim 1, wherein:
the feeding, external energy supply provides a supply voltage ($U_V$) with variable, especially fluctuating, voltage level.

7. The field-device electronics as claimed in claim 1, wherein:
the supply voltage ($U_V$) delivered by the external energy supply drives a supply current (I) of variable current strength, especially a current strength fluctuating in an essentially initially undeterminable manner.

8. The field-device electronics as claimed in claim 1, wherein:
there is provided in said operating and evaluating circuit at least one microprocessor, for which the first useful voltage ($U_{N1}$), or a secondary voltage derived therefrom, serves, at least partially, as an operating voltage.

9. The field-device electronics as claimed in claim 1, wherein:
there is provided in said operating and evaluating circuit at least one amplifier, for which at least one of the two useful voltages ($U_{N1}$, $U_{N2}$), or a secondary voltage derived therefrom, serves, at least partially, as an operating voltage.

10. The field-device electronics as claimed in claim 1, wherein:
there is provided in said operating and evaluating circuit at least one A/D-converter, for which the first useful voltage ($U_{N1}$), or a secondary voltage derived therefrom, serves, at least partially, as an operating voltage.

11. The field-device electronics as claimed in claim 1, wherein:
there is provided in said operating and evaluating circuit at least one D/A-converter, for which at least one of the two useful voltages ($U_{N1}$, $U_{N2}$), or a secondary voltage derived therefrom, serves, at least partially, as an operating voltage.

12. The field-device electronics as claimed in claim 1, further comprising:
means for comparing electric voltages falling in the field-device electronics and/or electric currents flowing in the field-device electronics.

13. The field-device electronics as claimed in claim 12, wherein:
the field-device electronics produces an alarm signal ($x_{pwr\_fail}$) signaling the under-supplying of the field-device electronics, at least when said operating and evaluating circuit detects a subceeding by the second useful voltage of a minimum useful voltage limit value predetermined for the second useful voltage and a subceeding by the third current component of a minimum current component limit value predetermined for the third current component.

14. A field device for adjusting at least one predetermined physical and/or chemical parameter, especially a flow rate, density, viscosity, fill level, pressure, temperature, pH-value, or the like, of a medium, especially a medium conveyed in a pipeline and/or a container, which field device comprises field-device electronics claim 1 after comprising, as well as an electrical-to-physical actuator electrically coupled with the field-device electronics, wherein:
said actuator reacts to changes of at least one applied control signal, especially a variable signal voltage and/or a variable signal current, with an adjusting motion of the actuator for influencing the parameter to be adjusted.

15. A field-device for measuring and/or monitoring at least one specified physical and/or chemical parameter, especially a flow rate, density, viscosity, fill level, pressure, temperature, pH-value, or the like, of a medium, especially a medium conveyed in a pipeline and/or a container, comprising: field-device electronics having an electric current controller which a supply current (I) flows for adjusting and/or modulating, especially clocking, the supply current (I); an internal operating and evaluating circuit for controlling the field device; and an internal supply circuit feeding said internal operating and evaluating circuit and lying at an internal input voltage ($U_e$) of the field-device electronics derived from the supply voltage ($U_V$), said internal supply circuit including: a first voltage controller ($UR_1$) through which, at least at times, an especially variable, first current component ($I_1$) of the supply current (I) flows for providing in the field-device electronics a first internal, useful voltage ($U_{N1}$) essentially controlled to be constant at a predeterminable, first voltage level ($U_{N1\_desired}$), a second voltage controller through which, at least at times, an especially variable, second current component ($I_2$) of the supply current (I) flows for providing in the field-device electronics a second internal, useful voltage ($U_{N2}$) variable over a predeterminable voltage range, and a voltage stabilizer through which, at least at times, an especially variable, third current component ($I_3$) of the supply current flows for adjusting and maintaining the internal input voltage ($U_e$) of the field-device electronics at a predeterminable voltage level, wherein: said operating and evaluating circuit has flowing there through, at least at times, both by an especially variable, first useful current ($I_{N1}$) driven by the first useful voltage ($U_{N1}$) and by an especially variable, second useful current ($I_{N2}$) driven by the second useful voltage ($U_{N2}$), as well as, electrically coupled with the field-device electronics, a physical-to-electrical, measurement transducer, which reacts to changes of the at least one parameter and issues, at least at times, at least one measurement signal ($s_1$, $s_2$) corresponding with the parameter, especially a measurement signal ($s_1$, $s_2$) in the form of a variable signal voltage and/or a variable signal current.

16. The field device as claimed in claim 15, wherein:
said operating and evaluating circuit includes at least one driver circuit for the measurement transducer, and the second useful voltage, or a secondary voltage derived therefrom, serves at least partially as operating voltage for a driver circuit.

17. The field device as claimed in claim 15, wherein:
said operating and evaluating circuit has at least one A/D-converter for the at least one measurement signal, and the first useful voltage, or a secondary voltage derived therefrom, serves, at least partially, as operating voltage for the A/D-converter.

18. The field device as claimed in claim 17, wherein:
said operating and evaluating circuit has at least one microcomputer, especially one in the form of a microprocessor and/or a signal processor, connected with the A/D-converter, for generating the measured value, and the first useful voltage serves at least partially as an operating voltage of the microcomputer.

19. The field device as claimed in claim 15, wherein:
said measurement transducer includes at least one measuring tube, insertable into the course of a pipeline, for conveying the medium.

20. The field device as claimed in claim 19, wherein:
at least one magnet coil is arranged at the measurement transducer for producing a magnetic field, especially a variable magnetic field, and
said at least one magnet coil has flowing through it, at least at times, an exciter current ($i_{exc}$), for generating the magnetic field, especially a bipolar exciter current, or one variable in a current strength, and the exciter current is driven by the second useful voltage, or a secondary voltage derived therefrom.

21. The field device as claimed in claim 15, wherein:
communicating, at least at times, via a data transmission system with an external control and review unit situated remotely from the field device, a communication circuit (COM) controlling the communication via a data transmission system provided therefor in the field-device electronics.

22. The field device as claimed in claim 21, wherein:
the first useful voltage ($U_{N1}$), or a secondary voltage derived therefrom, serves, at least partially, as an operating voltage for the communication circuit (COM).

23. The field device as claimed in claim 15, wherein:
the field-device electronics is electrically connected with the external energy supply solely via a single pair of electric lines and
the field-device electronics transmits the measurement value ($X_M$) produced at least at times to represent instantaneously, especially digitally, the at least one parameter to be measured and/or monitored, via the single pair of electric lines to an evaluation circuit provided in the external electrical energy supply and/or electrically coupled therewith.

24. The field device as claimed in claim 23, wherein:
an instantaneous current strength of the supply current, especially one set at a value lying between 4 mA and 20 mA, represents the instantaneously produced, measured value.

\* \* \* \* \*